US010737987B2

(12) United States Patent
Hartmann

(10) Patent No.: US 10,737,987 B2
(45) Date of Patent: *Aug. 11, 2020

(54) FLUID IONIZED COMPOSITIONS, METHODS OF PREPARATION AND USES THEREOF

(71) Applicant: BI-EN CORP., Portland, OR (US)

(72) Inventor: Richard O. Hartmann, Portland, OR (US)

(73) Assignee: BI-EN CORP., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,610

(22) Filed: Dec. 18, 2018

(65) Prior Publication Data

US 2019/0322598 A1 Oct. 24, 2019

Related U.S. Application Data

(63) Continuation of application No. 15/145,698, filed on May 3, 2016, now Pat. No. 10,189,751, which is a
(Continued)

(51) Int. Cl.
*C05B 17/00* (2006.01)
*C05B 7/00* (2006.01)
(Continued)

(52) U.S. Cl.
CPC ............... *C05C 1/00* (2013.01); *C05B 7/00* (2013.01); *C05B 17/00* (2013.01); *C05C 3/00* (2013.01);
(Continued)

(58) Field of Classification Search
CPC .................................. C05B 7/00; C05B 17/00
See application file for complete search history.

(56) References Cited

U.S. PATENT DOCUMENTS

| 394,982 A | 12/1888 | Hobson |
| 1,614,698 A | 1/1927 | Stillesen |

(Continued)

FOREIGN PATENT DOCUMENTS

| AU | 2011245115 B2 | 5/2015 |
| CN | 1407957 | 4/2003 |

(Continued)

OTHER PUBLICATIONS

Amberger et al., "Inorganic catalytical transformation of cyanamide and its metabolites in quartz sand I. Mechanism of cyanamide breakdown as influenced by iron oxides an moistures," Z. Pflanzenernaehr. Bodenkd, 141:665-676 (1978); English Summary on p. 676.

(Continued)

*Primary Examiner* — Wayne A Langel
(74) *Attorney, Agent, or Firm* — Schwabe Williamson & Wyatt, PC

(57) ABSTRACT

Disclosed herein are fluid ionized compositions, such as fluid calcium cyanamide fertilizer compositions, methods of preparation and uses thereof. In some examples, a fluid composition includes a mixture of about 40 to 20 parts of dissolved acid or acid-formed approximately neutral pH nitrogen plant nutrient compounds (such as urea ammonium nitrate and $H_2O$) and about 1 to about 5 parts of a mixture of insoluble or weakly soluble high pH calcium-formed plant nutrient compounds (such as calcium cyanamide and $H_2O$). The disclosed compositions and methods stabilize the compositions' contained active nutrient ions and digested carbon. The disclosed compositions and methods facilitate controllable site-directed delivery of the contents of the compositions. The compositions and methods are effective for microbes nourishment plant fertilizing, soil amending, heavy metals leaching inhibition, and digesting organic (Continued)

proteinaceous excreta. The compositions are stable, easily calibrated, and non-clogging for soil injection, spray and irrigation water delivery to target sites.

14 Claims, 9 Drawing Sheets

Related U.S. Application Data continuation of application No. 14/362,074, filed as application No. PCT/US2012/067378 on Nov. 30, 2012, now Pat. No. 9,359,263.

(60) Provisional application No. 61/565,004, filed on Nov. 30, 2011.

(51) Int. Cl.

| | |
|---|---|
| *C05C 1/00* | (2006.01) |
| *C05C 3/00* | (2006.01) |
| *C05C 5/04* | (2006.01) |
| *C05C 7/00* | (2006.01) |
| *C05C 9/00* | (2006.01) |
| *C05D 9/02* | (2006.01) |
| *C05D 3/02* | (2006.01) |
| *C05F 3/00* | (2006.01) |
| *C05G 5/23* | (2020.01) |
| *C05G 5/20* | (2020.01) |
| *C05C 5/00* | (2006.01) |

(52) U.S. Cl.

CPC .................. *C05C 5/04* (2013.01); *C05C 7/00* (2013.01); *C05C 9/00* (2013.01); *C05D 3/02* (2013.01); *C05D 9/02* (2013.01); *C05F 3/00* (2013.01); *C05G 5/20* (2020.02); *C05C 5/00* (2013.01); *Y02A 40/205* (2018.01); *Y02P 20/145* (2015.11); *Y02W 10/37* (2015.05)

(56) References Cited

U.S. PATENT DOCUMENTS

| | | | | |
|---|---|---|---|---|
| 3,060,011 | A | 10/1962 | Kaess | |
| 3,231,365 | A * | 1/1966 | Wahlberg | C05G 3/06 71/1 |
| 4,002,324 | A | 1/1977 | Huet | |
| 4,081,264 | A | 3/1978 | Ali | |
| 4,213,924 | A | 7/1980 | Shirley, Jr. | |
| 4,239,522 | A | 12/1980 | Wilson | |
| 4,352,688 | A | 10/1982 | Ott | |
| 4,392,881 | A | 7/1983 | Kneer | |
| 4,424,176 | A | 1/1984 | Shirley, Jr. | |
| 4,506,453 | A | 3/1985 | Shirley, Jr. | |
| 4,530,714 | A | 7/1985 | Kolc | |
| 4,626,270 | A | 12/1986 | Michaud | |
| 4,764,200 | A | 8/1988 | Meiss | |
| 4,812,045 | A | 3/1989 | Rivers | |
| 4,820,053 | A | 4/1989 | Rivers | |
| 4,935,173 | A | 6/1990 | Huey | |
| 4,975,106 | A | 12/1990 | Ferguson | |
| 4,994,100 | A | 2/1991 | Sutton | |
| 5,102,446 | A | 4/1992 | Burdick | |
| 5,120,345 | A | 6/1992 | Kayaert | |
| 5,211,985 | A | 5/1993 | Shirley, Jr. | |
| 5,212,940 | A | 5/1993 | Glover | |
| 5,335,449 | A | 8/1994 | Beatty | |
| 5,352,265 | A | 10/1994 | Weston | |
| 5,514,307 | A | 5/1996 | Shirley, Jr. | |
| 5,591,637 | A | 1/1997 | Inoue | |
| 5,698,004 | A | 12/1997 | Hartmann | |
| 5,917,110 | A | 6/1999 | Kust | |
| 5,938,813 | A | 8/1999 | Araya | |
| 5,976,212 | A | 11/1999 | Hartmann | |
| 5,997,601 | A | 12/1999 | Kust | |
| 6,383,245 | B1 | 5/2002 | Yamashita | |
| 6,576,035 | B2 | 6/2003 | Hartmann | |
| 7,695,541 | B1 | 4/2010 | Frizzell | |
| 7,785,388 | B2 | 8/2010 | Hartmann | |
| 9,359,263 | B2 * | 6/2016 | Hartmann | C05B 7/00 |
| 10,189,751 | B2 | 1/2019 | Hartmann | |
| 2002/0005053 | A1 | 1/2002 | Hayashi | |
| 2002/0121117 | A1 | 9/2002 | Hartmann | |
| 2004/0016275 | A1 * | 1/2004 | Hartmann | C05B 7/00 71/55 |
| 2005/0274164 | A1 | 12/2005 | Coates | |
| 2007/0062231 | A1 | 3/2007 | Spindler | |
| 2008/0016765 | A1 | 1/2008 | Hartmann | |
| 2010/0117023 | A1 | 5/2010 | Dopico | |
| 2010/0132422 | A1 | 6/2010 | Canari | |
| 2011/0154874 | A1 | 6/2011 | Rahn | |
| 2014/0311200 | A1 | 10/2014 | Hartmann | |
| 2016/0244377 | A1 | 8/2016 | Hartmann | |

FOREIGN PATENT DOCUMENTS

| | | | |
|---|---|---|---|
| CN | 1470482 | | 1/2004 |
| CN | 101440000 | | 5/2009 |
| CN | 102781880 | | 11/2012 |
| CN | 102939275 | | 8/2015 |
| DE | 3600704 | A1 | 7/1987 |
| DE | 3909587 | A1 | 9/1990 |
| DE | 4029955 | A1 | 3/1992 |
| EA | 021642 | B1 | 7/2015 |
| EP | 2785668 | | 6/2013 |
| GB | 231021 | | 3/1925 |
| GB | 2076795 | A | 12/1981 |
| JP | S52-075571 | A | 6/1977 |
| JP | 58120585 | A | 7/1983 |
| JP | S60-081081 | A | 5/1985 |
| JP | 2006-225175 | A | 8/2006 |
| WO | 1997/007036 | A1 | 2/1997 |
| WO | 2001/042170 | A1 | 6/2001 |
| WO | 2005/051867 | A1 | 6/2005 |
| WO | 2011/082301 | A2 | 7/2011 |
| WO | 2011/137393 | A1 | 11/2011 |
| WO | 2013/082485 | A2 | 6/2013 |

OTHER PUBLICATIONS

Amberger et al., English Summary of "The effect of combing straw-green manuring with calcium cyanamide in long-term field experiments." Z. Acker-u Pflanzenbau, 134:323-334 (Dec. 1971).

Andrews, "The Use of Cyanamide as the Source of Nitrogen." The Response of Crops and Soils to Fertilizers and Manures, Second Edition, 76-83 (1954).

Arenz et al., "Uber die Auswirkungeiner Cyanamidernährung Von Kartoffelpflanzen auf den Besatz mit Kartoffelkäferlarven," Zeitschrift fir Pflanzenkrankheiten (Pflanzenpathologie) und Pflanzenschutz, 59:334-339 (1953); English Summary on p. 339.

Auchmoody et al., "Effect of Calcium Cyanamide on Growth and Nutrition of Planted Yellow-Poplan Seedlings," Northeastern Forest Experiment Station, 265:1-11 (1973).

Bradley, "Genetic weeding and feeding for tobacco plants," New Scientist, 11 (Jan. 1992).

Bryant et al., "Effects of Nitrogenous Fertiliser on the Chemical Composition of Short-Rotation Ryegrass and its Subsequent Digestion by Sheep," Z.N. J. agric Res., 8:109-117 (1964).

Burgis et al., "Herbicides for Control of Weeds in Vegetable Seedbeds Also Control Root-Knot," Proceedings of the American Society for Horticultural Science, 52:461-463 (1948).

Kunz, English Summary of "Uber die innertherapeutische insektizide Wirkung des Cyanamids." Zeitschrift fir Pflanzenkrankheiten (Pflanzenpathologie) und Pflanzenschutz, 61:481-521 (1954).

Marlow, English Summary of "Result of mechanical and chemical control of weeds in the cultivation of bush beans over several years." Archiv Gertenbau, 12:161-182 (1964).

Fischbeck et al., English Summary of "Einfluß einer KalkstickStoffdingung bZW. einer Spritzung mit wasseriger Cyanamid-

(56) References Cited

OTHER PUBLICATIONS

Lösung auf den Belfall des Getreides mit Mehltau (Erysiphe graminis)." Zeitschrift für Pflanzenkrankheiten (Pflanzenpathologie) und Pflanzenschutz, 71:24-34 (1964).

Graham, "Weed and Root Knot Control in Tobacco Plant Beds by Surface Drench and other Treatments." Plant Disease Reporter, 40: 1041-1044 (Dec. 1956).

Heitefuß et al., English Summary of "Der Einfluß von Herbiziden und KalkStickstoff auf den durch Cerosporella herpOtrichoides Fron. Verursachten Halmbruch des Weizens." Zeitschrift fir Pflanzenkrankheiten (Pflanzenpathologie) und Pflanzenschutz, 641-659 (1968).

Hoorman et al., "Understanding Soil Microbes and Nutrient Recycling" Fact Sheet, Agriculture and Natural Resources, The Ohio State University, SAG-16-10; 5 pages (2010).

International Search Report and Written Opinion for PCT/US2012/067378 dated May 16, 2013; 13 pages.

Iwasaki, "Effects of Bud Scale Removal, Calcium Cyanamide, GA, and Ethephon on Bud Break of Muscat of Alexandria Grape (*Vitis uinifera* L.)," J. Japan. Soc. Hort. Sci., 48:395-398 (1980).

McCants et al., "Urea and Calcium Cyanamide in Tobacco Plant Beds." North Carolina Agricultural Experiment Station, Tech. Bul. 105:3-31 (May 1954).

McMurtrey, Jr., "Growing Better Tobacco," Economic Botany, 2:326-332 (1948).

Mojtahedi et al., "The Effects of Ammonia-Generating Fertilizer on Criconemoides xenoplax in Pot Cultures," Journal of Nematology, 8:306-309 (Oct. 1976).

Mullen et al., "Pre-emergence weed control in processing tomatoes," Western Society of Weed Science. Research Progress Report, II-12-II-13 (1992).

Rynk et al., "On-Farm Composting Handbook" Natural Resource, Agriculture, and Engineering Services (NRAES) Cooperative Extension, Ithaca, NY Jun. 1992; NRAES-54; pp. 1-23, 103-105.

Singh et al., "*Arabidopsis* Acetohydroxyacid Synthase Expressed in *Escherichia coli* Is Insensitive to the Feedback Inhibitors." Plant Physiol., 99:812-816 (1992).

Skoog, "Chemical Control of Weeds in Burley Tobacco Plant Beds." The University of Tennessee Agricultural Experiment Station, Bulletin 346:1-23 (Jul. 1962).

Smith et al., "Comparative Value of Cyanamied in Fertilization of Apple Trees: Soil Changes and Tree Response," Agricultural Experiment Station, Bulletin 273, 1-51 (1938).

Stransky et al., English Summary of "Isolation and properties of a cyanamid hydratase E.C. group 4. 2. 1. from Myrothcium verrucaria Alb. and Schw." Zeitschrift fuer Pflanzenphysiologie, 70:74-87 (1973).

Supplementary European Search Report dated Jun. 9, 2015, by ISA/The Hague for corresponding European Patent Application No. 12853178.7; 7 pages.

Suzuki et al., "Analysis of the Rotting Process of Rice Straw-Calcium Cyanamide Mixture by Physical Fractionation." Soil Sci. Plant Nutri, 21:173-183 (1975).

Ta, "Nitrogen Metabolism in the Stalk Tissue of Maize." Plant Physiol, 97:1375-1380 (1991).

Watson, Control of Root-Knot by Calcium Cyanamide and Other Means, Florida Agricultural Experiment Station, Bulletin 136, 145-160 (Apr. 1917).

Wunsch et al., English Summary of "The occurance of arginine in the metabolism of plants fed with cyanamide," Zeitschrift fuer Pflanzenphysiologie, 72:359-366 (May 1974).

\* cited by examiner

FLUID IONIZED COMPOSITIONS, METHODS OF PREPARATION AND USES THEREOF

CROSS REFERENCE TO RELATED APPLICATION

This application is a continuation of U.S. patent application Ser. No. 15/145,698, filed May 3, 2016, which is a continuation of U.S. patent application Ser. No. 14/362,074, filed May 30, 2014, which is the U.S. National Stage of International Application No. PCT/US2012/067378, filed Nov. 30, 2012, which was published in English under PCT Article 21(2), and which in turn claims the benefit of U.S. Provisional Application No. 61/565,004, filed Nov. 30, 2011, all of which are incorporated herein by reference in their entirety.

FIELD

The present application relates to fertilizers and in particular, to fluid ionized compositions, such as fluid calcium cyanamide (CaNCN) fertilizer compositions, methods of preparation and uses thereof, including, without limitation, in industry and farming, plant feeding fertilizing, organism carbon feeding, nitrogen nutrient stabilization, alkaline phosphate nutrient stabilization, excreta digestion odor/organism inhibition, particle digestion, soil amending, synergistic alkaline tissue digestion, anti-corrosion and anti-freezing.

BACKGROUND

Today's energy costly to produce, nearly insoluble, granular, dry, carbon, calcium containing dry calcium cyanamide (CaNCN) nitrogen fertilizer that can stabilize nitrogen and phosphate with its carbon and calcium. In moist to wet soil, as disclosed, its carbon feeds soil microbes, thus stabilizing its own nitrogen and compositions' contained nitrogen from leaching and its calcium can inhibit phosphate losses into environmental watersheds. It can also stabilize nitrogen and phosphate in other dry and fluid nitrogen fertilizers if combined with them. It has been used singly for fertilizing crops worldwide for more than a hundred years. However, dry calcium cyanamide fertilizer is associated with many disadvantages. For example, in addition to being energy costly, it has 50% lower nitrogen nutrient analysis than today's high nitrogen analysis, but leachable, urea. It requires up to twice as much to be equivalently nutrient effective to feed plants nitrogen as urea does. Although dry CaNCN fertilizer has been shown to provide additional ancillary benefits to young and maturing plants' health, these benefits are only observed when extremely large expensive quantities are used (such as application of hundreds of pounds per acre) making it far more costly as compared to current plant protectants. Additionally, historically used large, but noxious dust free, calcium cyanamide granules, to be fully hydrolyzed, must be in greater than 14× water (U.S. Pat. No. 7,785,388). This has been unreliable in sometimes poorly, rain-dependent, moistened soils for its macro and micro ionic nutrients and ancillary benefits to be fully effective. Also, if its benefits are to aid other dry nitrogen fertilizers by contributing its eco-safe nutrient stabilizing and ancillary benefits, the large granules are inefficiently not likely to be co joined next to the granules of the other fertilizers when both are physically mixed together and spread onto and into cultivated soils. Finally, because the evolving ionic forms can be toxic to seeds and seedlings, a waiting period between application and planting is often needed, which not only decreases the time for crop production, but can often result in fertilizer run-off into streams and rivers. Putting poorly soluble CaNCN hard, non-dusty granules or commercial dusty CaNCN powder into water containing vessels of urea nitrogen fertilizers to stabilize them causes the carbon and calcium containing particles to settle as un-sprayable sludge.

SUMMARY

Disclosed herein are fluid ionized compositions, such as fluid calcium cyanamide fertilizer compositions, methods of preparation and uses thereof. The disclosed compositions and methods create and stabilize active ionic compounds present in the compositions, such that nutrients can more effectively be taken up by plants, such as in crops. The disclosed compositions and methods facilitate controllable site-directed delivery of the contents of the ionized, compositions. The compositions and methods are effective for fertilizing, soil amending, calcium stabilizing leachable heavy metals in soil and metal tank corrosion prevention and freeze protection of the compositions, as well as providing ionized active calcium for odor and organism inhibition. The compositions are stable, easily calibrated, and non-clogging, such that they can effectively be used for immediate spray delivery application to target sites.

In some embodiments, a fluid composition includes a mixture of about 40 to 20 parts of dissolved acid or acid-formed nearly neutral pH nitrogen fluid plant nutrient compounds and about 1 to about 5 parts of a mixture of insoluble or weakly soluble high pH calcium-formed plant nutrient compounds. In some examples, the dissolved acid includes nitric acid, phosphoric acid, weak carbonic acids or a combination thereof. In some examples, such as some urea such as in some urea mixing/blending examples, the acid-formed nitrogen plant nutrient compounds are in solution and include ammonium nitrate, calcium nitrate, urea ammonium nitrate, calcium ammonium nitrate, ammonium phosphate, high pH aqueous ammonia or combinations thereof. In some examples the insoluble or weakly soluble high pH calcium-formed plant nutrient compounds are in solution and comprise calcium cyanamide ($CaCN_2$), gypsum (e.g. $CaSO_4.2H_2O$), calcium carbonate (e.g. $CaCO_3$), calcium chloride ($CaCl_2$), potassium chloride (KCl), potassium sulfate (KS) or combinations thereof.

Methods of using the disclosed compositions include, without limitation, in industry and farming, plant feeding, nutrient stabilization, calcium decomposition (composting) to deprive odor and disease causing organisms their food habitat, fertilizing and soil amending, freezing prevention and corrosion prevention. In one example, a method of treating excreta is disclosed. In some examples methods of treating excreta can include adding an effective amount of a disclosed fluid composition to excreta, where the $H_2O$ present in the fluid mixture comprises less or more than 14× the mass of the insoluble or weakly soluble high pH calcium formed plant nutrient compounds, thereby forming a mixture of treated excreta.

Methods of enhancing plant growth are also disclosed. In one example, a method of enhancing plant growth includes applying an effective amount of a disclosed fluid compositions in which the $H_2O$ present in the fluid composition comprises at least 14× the mass of the insoluble or weakly soluble high pH calcium formed plant nutrient compounds to soil prior to, during and/or after planting, thereby enhancing plant growth.

Methods of digesting insoluble or weakly soluble high pH calcium-formed plant nutrient compounds to form ionized calcium compounds are also disclosed. In some examples, the methods include combining a mixture of about 40 to about 20 parts of dissolved acid or acid-formed approximately neutral pH nitrogen plant nutrient compounds to about 1 to about 5 parts of a mixture of insoluble or weakly soluble high pH calcium-formed plant nutrient compounds, where the dissolved acid includes nitric acid, phosphoric acid, a weak carbonic acid or a combination thereof and the acid-formed nitrogen plant nutrient compounds are in solution and includes ammonium nitrate, calcium nitrate, urea ammonium nitrate, calcium ammonium nitrate, ammonium phosphate, high pH aqueous ammonia or combinations thereof which hydrolyze the insoluble or weakly soluble high pH calcium-formed plant nutrient compounds in solution which can include calcium cyanamide with its free carbon, gypsum, calcium carbonate, calcium chloride or combinations thereof, thereby forming ionized elements from within calcium compounds and hydrolysis activated, particle digested carbon.

Also provided are methods of making a fluid composition. In some examples, a method of making a fluid composition includes combining a mixture of about 40 to 20 parts of dissolved acid or acid-formed approximately neutral pH nitrogen plant nutrient compounds to about 1 to about 5 parts of a mixture of insoluble or weakly soluble high pH calcium-formed plant nutrient compounds, where the dissolved acid includes nitric acid, phosphoric acid, a weak carbonic acid or a combination thereof and the acid-formed nitrogen plant nutrient compounds are in solution and comprise ammonium nitrate, calcium nitrate, urea ammonium nitrate, calcium ammonium nitrate, ammonium phosphate, high pH aqueous ammonia or combinations thereof and the insoluble or weakly soluble high pH calcium-formed plant nutrient compounds are in solution and comprise calcium cyanamide, gypsum, calcium carbonate, calcium chloride or combinations thereof, thereby forming a fluid composition.

The foregoing and other features and advantages of the disclosure will become more apparent from the following detailed description, which proceeds with reference to the accompanying figures.

DETAILED DESCRIPTION OF SEVERAL EMBODIMENTS

I. Introduction

Figure 1:
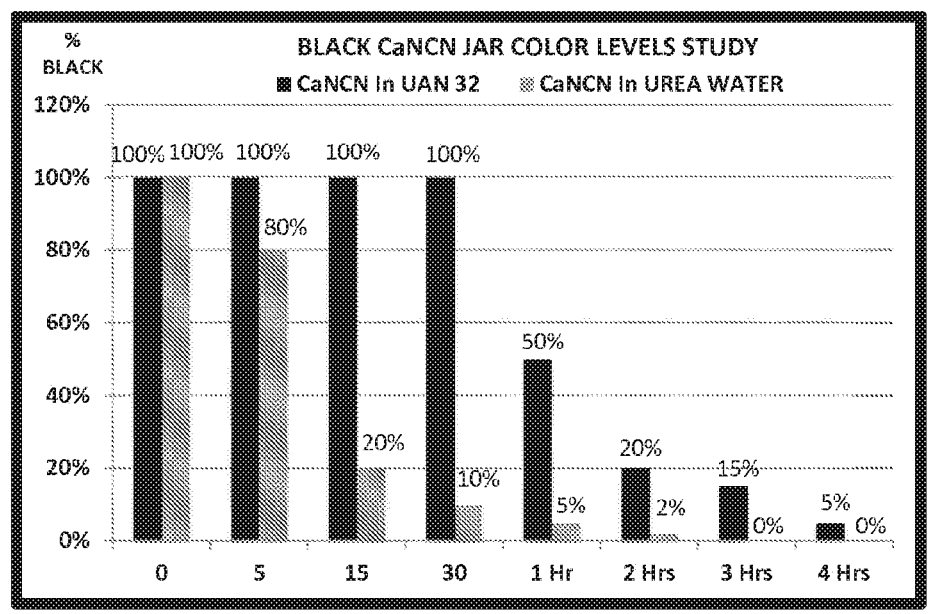
FIG. 1 is a bar graph showing the differences over time of the levels of black carbon color from calcium cyanamide (CaNCN) carbon in mixed solutions of urea ammonium nitrate (UAN 32) comprising 20% water and urea in 57% water. Shown in the figure, there is considerably more insoluble black carbon suspended for a longer time in the UAN solution, which demonstrates that the disclosed solutions are more saturated with CaNCN ionic elements than in solutions with water.

Embodiments disclose creating ionized fluid calcium cyanamide with calcium fertilizer or other calcium containing compounds or compositions, by combining them with acid based nitrogen or calcium containing compounds of other fluid fertilizers, such as fluid Urea Ammonium Nitrate (UAN), Calcium Ammonium Nitrate (CAN), Ammonium Nitrate (AN) or Ammonium Phosphate. The latter are for digesting dry calcium cyanamide particles to sprayable particles and thus speed up its hydrolysis to ionic component solutions where its carbon-is digested to finer, much larger surface area, particles that may be graphene, reported as a possible silicon replacement memory tool, or other carbon allotropes that are easily suspended or solutionized. An electrolytic suspension agent may be added to assure the carbon's suspension. Simple blending and no added heat is needed.

Surprisingly, without the disclosed fluids' degradation, a full spectrum of additional plant nutrients may be added to water or water containing fluid manures into which such nutrients may be added, where the disclosed composition processes further digest the particles of those additives where the CaNCN or added particles do not harden together and settle. This process affords fluid blending fertilizer dealers to no longer need the energy for heat to dissolve urea to attain higher fluid urea nitrogen analysis.

The compositions reduce the crystallization freezing points of saturated nitrogen fluids (UAN 32) from 32° F. down to below about 0.0° F. This reduces the need, in colder climates, to reduce UAN 32 down to UAN 28 to reduce UAN's freezing point down to 1° F. The compositions raise the neutral pH of UAN to above 7.8 to essentially eliminate UAN tank welds' cracking ferrous corrosion (Wilson, Fodor, Kenton U.S. Pat. No. 4,239,522), without standard UAN corrosion inhibitors such as chromate, dichromate or phosphorus ions.

CaNCN/UAN has demonstrated to dramatically reduce CaNCN particle sizes to immediately sprayable sizes as compared to urea in water and non-calcium cyanamide/UAN. Today, UAN, which is suitable for combined pesticide applications, is evermore becoming the choice nitrogen fertilizer. As herein disclosed, calcium cyanamide stabilized UAN can easily be made by fluid fertilizer dealer blenders, for cleaner water watersheds one watershed at a time. Annual use statistics for U.S. fluid nitrogen fertilizers are 12,000,000 tons/annum for UAN, 6,000,000 tons/annum for dry urea and 4,000,000 tons/annum for compressed gas ammonia.

In corn replicated field studies, a microchip (1 mm) of calcium cyanamide, pre-hydrolyzed in 300° F. moist hot urea factory melted urea to become a pre-hydrolyzed CaNCN seed inside each urea granule always increased yields to an average over urea of 11%, over 8 years, in both wet and dry years and reached surprisingly lower nitrogen to higher yield ratios for greater nutrient use efficiency (NUE). This lowers nitrogen use and thus less exposure for loss to ground waters and release of ozone suspect nitrous oxide gas to air.

It would be very desirable for the public and farming practices to have pre-hydrolyzed, immediately sprayable/injectable, fluid ionic plant nutrients from fines and granules of calcium cyanamide, to stabilize pollution suspect, but lower cost, fluid common fertilizers and manures where the combined comprise carbon fed soil microbes' that hold otherwise leachable, to non-leachable, nitrogen and phosphate that feeds plants and soil microorganisms in an eco-safe manner, until plant root hairs need them including other macro and micro plant foods in soluble solution forms that may be co-applied for them all to comply with environmental pollution laws where the nutrients all go into plants so they are not before, during and after season-exposed to leaching into ground waters.

Although calcium cyanamide is defined as a nitrification inhibitor (AAPFCO N-12 vol. 57), the present application discloses that hydrolyzed active carbon feeds soil microbes which hold nutrients in the soil to attain the AAPFCO definition effects, which are where low percentages of CaNCN fertilizer can prevent nitrogen and phosphate plant food components from being lost to leaching into ground waters before the plants can use them all up.

Nearly immediately, after high pH in water CaNCN (12.2 pH) is in moist soil below 10 pH, the hydrolyzed acid HNCN dimerizes to dicyanamide (DCD) which is a nitrogen only stabilizer DCD, that is exempt from pesticide regulation.

Over numerous corn field studies (12 years), the inventor discovered that as little as a 0.25% calcium cyanamide additive to UAN can speed up common granular and fluid nitrogen fertilizer plant uptake and in doing so prevent pollution and increase crop yields in ranges from 5-13% and sugar energy 33%, and thus well pays for and gets multiples of dollar returns (ROIs) in yields from disclosed otherwise costly high rates of calcium cyanamide fertilizer alone. Calcium cyanamide prevention of nitrogen (N) and phosphorus (P) loss to ground waters, instead going into corn kernel food and energy yields, was expressed by at-harvest higher corn ear leaf N.

In a station field corn study, it was determined that calcium cyanamide powder at as low as 0.25% in UAN increased average yields 13% over UAN only, at down to 66% less nitrogen. In a similar study—the carbon UAN-average-corn plant chlorophyll was increased 9% with again less nitrogen than UAN alone. Chlorophyll, the plant's means to absorb and convert sun energy to starch energy, is related to plant conversion to sugar energy.

Nitrate ($NO^3$) N in UAN is reported to rob plants of energy for the plants to convert it to plant useable $NH_4$ N. High sugar brix energy corn is important in increasing corn biofuel yields. In the field corn studies of microbe held N fertilizers, along with other recent farm innovations, yielded up to 150 gallons more biofuel per acre while producing 2.8× more food from corn on today's corn acres, over non-calcium cyanamide stabilized N. Calculated, this made-in-USA energy and not buying foreign fossil energy at $2.50/gallon gasoline adds up to ½ $trillion/annum stimulus for U.S. jobs and treasuries economy. Sweeter (more energy)

food and feed is preferred by humans and naturally by animals. And, such healthier plants express natural plant immunity resistance against plant antagonists.

During the corn studies, simultaneously in California strawberry culture, the inventor attempted to add dry calcium cyanamide to fluidized urea containing 14× water. However, it plugged valves and screens. A successful decant filtering system was implemented, but it left solid hardened cakes of soil-valuable carbon and plant valuable calcium in near insoluble form to be separately discarded in piles.

The decant CaNCN/urea aliquot in irrigation delivery systems proved to display the same traits in strawberries as in corn, but at high dilution aliquot rates. Pre-planting, in its high pH created soil made it alkaline tissue digestion unfavorable to young plant root antagonists and competing plants, for less young plant pressures. In sequential post-plant drip irrigations it sequentially, via contributing a higher carbon/nitrogen ratio instead of nitrogen only, created uniform blossoming and picks which increased strawberry yields. And one study showed curing calcium deficiency in an unheard of brief period of 3 days. These aspects increased mid-season strawberry yields over standard practice costly slow release fertilizer and costly soil cleaning, ozone suspect, methyl bromide gas. Low cost fast release common fertilizer in these plots had best results over high cost slow release fertilizer. Together, these features can save the California strawberry industry greater than $100,000,000/annum.

Unanticipated, a Greenfield Calif. two years pre-plant strawberry bed triple replicated studies demonstrated the superiority of carbon stabilized UAN over carbon/calcium sludge drop out below decant aliquot stabilized urea in irrigation water systems. In these studies, the reduced weed pressure from 50 lbs of nitrogen/acre from calcium cyanamide carbon stabilized UAN exceeded such response from 100 lbs of nitrogen from stabilized aliquot CaNCN/urea. This suggested that UAN was a much more active companion to calcium cyanamide than urea. This calls attention to ammoniated nitric acid ammonium nitrate added to urea in UAN being the operative in improved calcium cyanamide hydrolysis from its UAN particle digestion in the present disclosure disclosed ionic states, which enhances urea hydrolysis to gaseous ammonia in water, that's associated with high pH alkaline tissue digestion.

Agriculture farm watersheds that need stabilized nitrogen, such as Midwestern agriculture farm watersheds, are dependent upon rain water and therefore do not have irrigation options to precision deliver fertilizers to those plants. One option was to blend calcium cyanamide and urea into water and directly spray/shank/inject onto/into crop soils. However, in spite of many suspension agent jar tests, often this still led to calcium cyanamide plugging of sprayer screens. In the Midwest this proved that short time water residence did not dissolve commercial calcium cyanamide's larger solid sizes. Expensive re-shipping of on hand stock to expensive milling/blending and re-packaging processes to make uniform fine sprayable calcium cyanamide powder solids became the only solution. Such uniform powder in water did not stay fully suspended for an hour and had to be pre-circulated to attain uniform field applications.

About 300 jars were used in testing the addition of various agents to water to attain calcium cyanamide screen passage and suspension through screen sizes used in sprayers, such as 80 mesh and finer up to 200 mesh. None were successful. Heating aided this somewhat, but not satisfactorily.

Surprisingly, commercial calcium cyanamide poured into jars of fluid UAN 32 and shaken allowed all the solids to pass through 80 and 100 mesh screens and even 200 mesh screens. That suspension lasted over 3 hours. Nozzle plugging was not experienced in any of the studies when CaNCN was mixed into jars of UAN.

Further jar tests revealed that similar action to UAN 32 was attained in fluid AN 20 and CAN 17. This demonstrated that it's the ammonium nitrate or reformed nitric acid that likely caused the increased calcium in calcium cyanamide particle digestion to enhance hydrolysis to disclosed ionic fluid calcium cyanamide compositions.

All previous jar tests with calcium cyanamide dissolved in water or aqua ammonia created near immediate settlements of large black particles of calcium cyanamide.

The solution to the this dilemma turned out to be to first make a concentrate of 5% calcium cyanamide in UAN. Then dilute it by pouring that concentrate into dissolved urea in water (Urea 20) or ammonia in water (Aqua 20) to 10× dilution (0.5% calcium cyanamide) needed to hold the soil nitrogen when using the latter two. Thus, the latter two had uniform fluid ionized calcium cyanamide throughout that lasted for days.

The only drawback of not using UAN is the lack of urea hydrolysis in UAN that contributes to the disclosed high pH alkaline digestion.

Gaseous ammonia ($NH_3$) fertilizer is typically injected deep into soil to prevent its gaseous escape in Midwest field crop culture, rather than the disclosed strawberry bed top spray and sprinkle method or in drip irrigation water methods to create the disclosed water alkaline digestion of protein matter on bed surfaces.

UAN's urea digested to ammonia essentially resulted in aqua ammonia. However it is not atmospheric or human ammonia exposure allowed in closely inhabited strawberry culture whereas, safe urea in water or UAN is well accepted for topical soil application. It can be bed top sprayed and sprinkle irrigated or precision placed in precision placed irrigation water to un-cropped or cropped soils, it was discovered that irrigation water traps the ammonia even better than plastic tarping for controlled soil conversion to harmless soil attaching ammonium ($NH_4$) fertilizer. There's no irrigation in Midwest field crops culture.

Additional jar studies revealed that when a powerful light was put against the jar of the black calcium cyanamide suspension, right after combining the two, one could see a black pillowing or blooming effect, like a volcano erupting. Black calcium cyanamide in water with dissolved urea never showed such effect. This suggested that ammoniated nitric acid ammonium nitrate added to urea in UAN likely caused the digesting of the non-uniform black calcium carbonate solids. Powder calcium cyanamide in UAN made uniform tiny micro particles that passed through even the smallest screen sizes. Thus, these fine particles hydrolyzed faster to CaNCN ionic macro and micro nutrient ions, uniformly saturating its UAN diluent, displayed by longer floating of CaNCN's otherwise insoluble carbon. This demonstrated that the solution mixtures were likely all in solution far longer than imagined possible, or as black carbon displayed at least 300% longer than water only. In a subsequent commercial venturi by-pass MDB test run carbon stable-UAN, without suspension agent stayed completely black for weeks, with maximum 25% reduction in the black level for months, suggesting the alteration was permanent.

CaNCN (0.025% to 0.05%) added to UAN indicated that compounds within commercial CaNCN became fully ionic elements. Surprisingly, the concentrate UAN digestion process, in jars after 12 hours, displayed a yellow aliquot visually showing the hydrolyzing of calcium cyanamide's 2.5% considered insoluble calcium sulfate, (gypsum) micro nutrient to ionic sulfur ion elements, for immediate plant uptake. This supported the supposition that the UAN digestion of calcium cyanamide assured the full hydrolysis of all calcium cyanamide compounds into their ionic elements. Thus, finished disclosed compositions with added nutrient compounds likely all comprise fully plant soluble ionic elements in the disclosed compositions.

This means that plant root hairs, which can only take in or let out their nutrients by osmosis from osmotic pressure variances through semi-permeable membranes, going from hypertonic to hypotonic to static isotonic states inside the root hair cells, are more likely to take those in if as in disclosed solution compositions they primarily comprise ions rather than dissolved compounds. See disclosed figures and tables 6 (Sugar Brix), 10 (Yield Increases) 11 (Ear Leaf N). Osmotic pressures are associated with water of crystallization and lowering of freezing points of solutions (Jacobus H. van 't Hoff; Osmotic pressure and chemical equilibrium; Nobel Lecture, Dec. 13, 1901) See disclosed figures and Table 9 (Freezing). The disclosed figures and tables demonstrate un-obvious enhanced responses compared to soil fertilization with common fertilizer compounds and lowered freezing points of the disclosed composition solutions.

Also, the disclosed compositions are more likely to assure plant nutrient element assimilation of micronutrients in soluble ionic forms in soil solutions from fluid calcium cyanamide/UAN compositions (nitrogen, calcium, iron, silicon, aluminum, magnesium, nickel, sulfur). Adding the disclosed compositions to animal digested fluid excreta manures will do the same with their animal digested phosphate, potash and contained micronutrients. And, calcium cyanamide digested excreta will add a new array of broad spectrum, digested organics and micronutrients contained, ionic composition fertilizers.

Ionic calcium cyanamide components in water depend on its hydrolysis. In the disclosed study 5% UAN was added to calcium cyanamide in 14× water. 5% UAN increased calcium cyanamide hydrolysis toward its theoretical ionic cyanamide nitrogen yield by 25% over water only within 15 minutes. An additional laboratory water study took one hour to reach 90% of theoretical cyanamide nitrogen yield. The disclosed study was intended to determine if UAN increased hydrolysis time to cyanamid (NCN) over water only. If as here disclosed the mixtures were 95% UAN (comprising 20% water) and 5% calcium cyanamide it is expected that the full hydrolysis to full theoretical cyanamide yield would be within or much less than 15 minutes, based on disclosed discovered "volcano eruption" like action, from 5% calcium cyanamide/95% UAN.

In a subsequent study, a 200 gallon UAN/5% CaNCN concentrate was prepared using a commercial fertilizer blending system that comprised a venturi MDB by-pass system for inductions. Non-uniform calcium cyanamide solids were inducted into MDB venturi circulating UAN. The resulting concentrate stayed in near full suspension/dilution for weeks. Slight jar tipping disturbance made it go back into apparent full suspension/dilution solution. An added electrolytic suspension agent never before displayed such micro black insoluble carbon particles to staying in full suspension, indicating indefinitely.

This means that calcium cyanamide can become fluid calcium cyanamide. A concentrate of that was diluted in water and fluid manures without caking and where the dilute comprised all the calcium cyanamide components and its nutrient compounds into rapidly plant absorbable, soluble ionic forms. Recently, jar tests of fluid AN (Ammonium Nitrate) and fluid CAN (Calcium Ammonium Nitrate) displayed the same as UAN or better.

Calcium cyanamide in water initially reaches 12.2 pH. Calcium cyanamide added to UAN as a concentrate moves to a pH of 9.5. At equilibrium it becomes 8.5 pH. 0.25% calcium cyanamide sustains a pH of 8.5. Wilson, Fodor, Kenton (U.S. Pat. No. 4,239,522) claim that a pH of at least 7.8 is sufficient to substantially eliminate ferrous corrosion. Today UAN 28-32 older storage tanks' weld cracking is a top level of EPA pollution and OSHA accident concerns.

In the winter, jars of suspension agent calcium cyanamide/UAN 32 compared to UAN 32 only were left outside overnight at below freezing temperatures. The calcium cyanamide jars had no crystals in them the next morning, compared to 90% crystals UAN jars where these crystals would not pass through a gauze mesh but the CaNCN/UAN full passed through the gauze. This was extended in a freezer where the same comparative results were demonstrated down to 0° F. This can become major economic storage and shipping savings.

The disclosed compositions are associated with a number of advantages including, but not limited to, the following: (1) mitigate the limitation of UAN composition freezing points; (2) mitigate UAN metal tanks corrosion; (3) speed the hydrolysis of calcium cyanamide hydrolysis to ionic nutrient forms; (4) increase the delivery time and uptake of nutrients into plants of ionic calcium cyanamide and combined macro and micronutrients in carbon stabilized UAN compositions; (5) increase plant sugar production from UAN N; (6) increase calcium cyanamide inside UAN plant yields over UAN only; (7) have a venturi, MDB circulation or the like, in fluid fertilizer blending plants while circulating UAN to attain calcium cyanamide micro particles status to attain stabilized UAN in long suspension/solution states; (8) have UAN speed up hydrolysis and particle digestion of calcium cyanamide, (9) have UAN hydrolysis assure the delivery of all calcium cyanamide and combined nutrient sources, including fluid manures, in ionic states; (10) have ammonium nitrate added to urea in UAN which enhances the digestion of calcium cyanamide particles over urea only; (11) have calcium cyanamide inside UAN to increase nutrient use efficiency (NUE) more than with urea; (12) where calcium cyanamide/UAN solves the issues incurred in pre-hydrolyzing calcium cyanamide in water before usages, such as losing calcium and carbon to waste piles from near immediate settlement of calcium cyanamide solids into hard cakes of carbon and near insoluble calcium carbonate; (13) where UAN solves clogged valves and screen problems that prevent immediate spraying in water of calcium cyanamide stabilized fertilizers and fluid manures; (14) where UAN eliminates expensive milling/blending/re-packaging of factory grade over size particles to prepare commercial calcium cyanamide for into water mixtures; (15) where UAN extends the time of calcium cyanamide in solution and or suspension; and (16) where UAN and agents create a base fluid stabilized composition suitable to add any numbers of plant food nutrients to deliver a full spectrum of ionized plant food elements in one fluid solution. The disclosure's increased plant responses to the disclosed fluid ionized compositions also indicates that calcium cyanamide nitrogen microbe stabilization can result from microbes more rapidly consuming the disclosed soluble, likely molecular, carbon form and absorbing the disclosed nitrogen composition's nitrogen for later release as plant roots consume the decayed microbes' containing nitrogen

II. Overview of Several Embodiments

Disclosed herein are fluid ionized compositions, such as fluid calcium cyanamide fertilizer compositions, methods of preparation and uses thereof, including, without limitation, in industry and farming, plant feeding, nutrient stabilization, decomposition (composting), odor and organism inhibition, fertilizing and soil amending. In some embodiments, a fluid composition includes a mixture of about 40 to 20 parts of dissolved acid or acid-formed approximately neutral pH nitrogen plant nutrient compounds and about 1 to about 5 parts of a mixture of insoluble or weakly soluble high pH calcium-formed plant nutrient compounds, where the dissolved acid comprises nitric acid, phosphoric acid, a weak carbonic acid or a combination thereof and the acid-formed nitrogen plant nutrient compounds are in solution and comprise ammonium nitrate, calcium nitrate, urea ammonium nitrate, calcium ammonium nitrate, ammonium phosphate, high pH aqueous ammonia or combinations thereof; and the insoluble or weakly soluble high pH calcium-formed plant nutrient compounds are in solution and comprise calcium cyanamide, gypsum, calcium carbonate, calcium chloride, potassium chloride, potassium sulfate or combinations thereof, and microbe nutrient free carbon.

In some embodiments, a disclosed composition includes dissolved acid or acid-formed approximately neutral pH nitrogen plant nutrient compounds including a urea ammonium nitrate (UAN), where the UAN solution comprises about 30% to about 35% urea, about 40% to about 45% ammonium nitrate with the residual as $H_2O$; and the insoluble or weakly soluble high pH calcium-formed plant nutrient compounds are in solutions comprising $H_2O$ that contain calcium cyanamide. In some embodiments, the $H_2O$ present in the fluid mixture comprises less than 14× the mass of the insoluble or weakly soluble high pH calcium formed plant nutrient compounds in the mixture. In some embodiments, the $H_2O$ present in the fluid mixture comprises at least 14× the mass of the insoluble or weakly soluble high pH calcium formed plant nutrient compounds in the mixture.

In some embodiments, a disclosed composition includes about 5 percent to about 10 percent by weight calcium cyanamide, such as about 7 percent to about 8 percent by weight calcium cyanamide.

In some embodiments, a disclosed composition further includes excreta, such as liquidized manure. In some embodiments, the excreta is dairy.

In some embodiments, the disclosed composition includes from about 0.01 percent calcium cyanamide to about 99.99 percent UAN solution and from about 0.1 percent to about 99.9 percent fluid excreta.

In some embodiments, the disclosed composition includes about 25 percent calcium cyanamide, about 75 percent UAN solution and from about 25 percent excreta.

In some embodiments, a disclosed composition includes at least one non-nitrogen material to the mixture, such as a plant nutrient. In some embodiments, the non-nitrogen material includes phosphorous, potassium, iron, copper, zinc, manganese, boron, magnesium, molybdenum, sulfur, nickel, and mixtures thereof.

In some embodiments, a disclosed composition includes an electrolytic suspension agent, such as aniline or nigrosine or carbon black ionic substances or ionized metal elements, such as silicon, iron, aluminum, carbon or a combination thereof.

In some embodiments, the approximately neutral pH nitrogen plant nutrient compound mixtures include a pH of about or above 7.8 and 7.9.

In some embodiments, a disclosed composition includes particles with an about 200 mesh screen pass through.

In some embodiments, a method of treating excreta includes adding an effective amount of a disclosed fluid composition to excreta, where the $H_2O$ present in the fluid mixture comprises at least 14× the mass of the insoluble or weakly soluble high pH calcium formed plant nutrient compounds, thereby forming a mixture and treating excreta.

In some embodiments, the excreta is liquidized manure. In some embodiments, the excreta is not limited to, dairy.

In some embodiments, the method further includes adding at least one non-nitrogen material to the mixture, such as a plant nutrient. In some embodiments, the non-nitrogen material is selected from the group consisting of phosphorous, potassium, iron, copper, zinc, manganese, boron, magnesium, molybdenum, sulfur, nickel, and mixtures thereof.

In some embodiments, the method further includes adding an electrolytic suspension agent to the mixture, such as an ionized metal element, such as silicon, iron, magnesium, nickel, aluminum, carbon or a combination thereof.

In some embodiments, the approximately neutral pH nitrogen plant nutrient compound mixture has a pH of or above about 7.8 and 7.9.

In some embodiments, the fluid composition used to treat the excreta comprises particles of with an about 60 to about 100 mesh pass through screen size, such as about 80 to about 100 mesh pass through screen size.

In some embodiments, the method of treating excreta further includes applying the mixture to soil by spraying.

In some embodiments, a method of enhancing plant growth includes applying an effective amount of a disclosed fluid composition in which the $H_2O$ present in the fluid composition comprises at least 14× the mass of the insoluble or weakly soluble high pH calcium formed plant nutrient compounds to soil prior to, during and or after planting, thereby enhancing plant growth.

In some embodiments, applying an effective amount comprises applying the composition by spraying, shank soil injection or into sprinkler or drip irrigation.

In some embodiments, a method of making a fluid composition includes combining a mixture of about 40 to 20 parts of dissolved acid or acid-formed approximately neutral pH nitrogen plant nutrient compounds to about 1 to about 5 parts of a mixture of insoluble or weakly soluble high pH calcium-formed plant nutrient compounds, where the dissolved acid includes nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, ammonium phosphate, high pH aqueous ammonia or combinations thereof and the insoluble or weakly soluble high pH calcium-formed plant nutrient compounds are in solution and comprise calcium cyanamide, gypsum, calcium carbonate, calcium chloride or combinations thereof, thereby forming a fluid composition.

In some embodiments, the method of making a fluid composition is one in which the dissolved acid or acid-formed approximately neutral pH nitrogen plant nutrient compound is a urea ammonium nitrate (UAN), where the UAN solution comprises about 30% to about 35% urea, about 40% to about 45% ammonium nitrate with the residual as $H_2O$; and the insoluble or weakly soluble high pH calcium-formed plant nutrient compounds are in solution comprising $H_2O$ and include calcium cyanamide.

In some embodiments of the method of making, the $H_2O$ present in the fluid mixture includes less than 14× the mass of the insoluble or weakly soluble high pH calcium formed plant nutrient compounds in the mixture.

In some embodiments of the method of making, the $H_2O$ present in the fluid mixture comprises at least 14× the mass of the insoluble or weakly soluble high pH calcium formed plant nutrient compounds in the mixture.

In some embodiments of the method of making, the combining is performed in the presence of a circulation process, such as a venturi by-pass MDB circulation system.

In some embodiments, the method of making further includes adding at least one non-nitrogen material to the composition, such as a plant or microbe nutrient.

In some embodiments, the non-nitrogen material is selected from the group consisting of phosphorous, potassium, iron, copper, zinc, manganese, boron, magnesium, molybdenum, sulfur, and mixtures thereof.

In some embodiments, the method of making further includes adding excreta to the composition, such as liquidized manure. In some embodiments, the excreta is dairy excreta.

In some embodiments, the method of making is performed in an opened container.

In some embodiments, the method of making is performed in an unsealed container.

In some embodiments, the method of making is performed in the presence of atmospheric $CO_2$.

In some embodiments, the method of making further includes dehydrating the fertilizer composition to form a solid.

In some embodiments, a method of digesting insoluble or weakly soluble high pH calcium-formed plant nutrient compounds to form ionized calcium compounds includes combining into a mixture of about 40 to about 20 parts of dissolved acid or acid-formed approximately neutral pH nitrogen plant nutrient compounds to about 1 to about 5 parts of a mixture of insoluble or weakly soluble high pH calcium-formed plant nutrient compounds. Then the dissolved acid comprising nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, ammonium phosphate, high pH aqueous ammonia or combinations thereof and hydrolyze the insoluble or weakly soluble high pH calcium-formed plant nutrient compounds in solution which comprise calcium cyanamide, gypsum, calcium carbonate, calcium chloride or combinations thereof, thereby forming ionized calcium compounds and insoluble carbon.

In some embodiments of the method of digesting, the mixture of insoluble or weakly soluble high pH calcium-formed plant nutrient compounds includes calcium cyanamide.

In some embodiments of the method of digesting, the combining is performed in the presence of a circulation process, such as a venturi by-pass system.

III. Abbreviations and Terms a. Abbreviations

F: Fahrenheit

N: nitrogen

NUE: nutrient use efficiency

P: phosphorus

Tons/a: tons per acre

UAN: urea ammonium nitrate

CaNCN calcium cyanamide b. Terms

The following explanations of terms and methods are provided to better describe the present disclosure and to guide those of ordinary skill in the art in the practice of the present disclosure. As used herein and in the appended claims, the singular forms "a" or "an" or "the" include plural references unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. It is further to be understood that any quantitative values are approximate whether the word "about" or "approximately" or the like are stated or not. All percentages and ratios are calculated by weight unless otherwise indicated.

Acid-formed approximately neutral pH nitrogen plant nutrient compound: A phrase to include compounds including ammonium nitrate, calcium nitrate, urea ammonium nitrate, calcium ammonium nitrate, ammonium phosphate, high pH aqueous ammonia or combinations thereof.

Ammonia: A compound of nitrogen and hydrogen with the formula $NH_3$. Ammonium is the ionized form of ammonia and has a formula of $NH_4$. In some embodiments, a disclosed composition includes ammonia and or ammonium, such as ammonium nitrate, calcium nitrate, urea ammonium nitrate, calcium ammonium nitrate, ammonium phosphate, high pH aqueous ammonia with or without additives or combinations thereof. Additionally, where high pH ammonia in water digestion breaks down moist living or dead organic matter, as disclosed, it can result in the disclosed plant matter effects.

Calcium: Calcium ions ($Ca^{2+}$) are present in most organic matter and are necessary for many enzymatic reactions, including those that facilitate energy use by living organisms such as microbes. Furthermore, calcium ions aid in soil reclamation by flocculating soil and permitting water percolation. Additionally, calcium tends to enhance the breakdown of organic or carbon matter through these and other actions.

While calcium ions are abundant in nature in naturally occurring limestone (calcium carbonate, $CaCO_3$), they are not readily available for uptake because of the relative insolubility of calcium carbonate. From this is seen the need to stabilize calcium ions in soluble form to enhance the speed of calcium uptake into organic matter, both living and dead, to aid plant growth and soil reclamation. In some examples, the disclosed compositions include calcium.

Calcium Cyanamide (CaNCN): A composition including about 44% calcium and about 24% nitrogen and about 12% carbon was first made in the late 1800s, as part of a search for a high analysis nitrogen source for industry and agriculture to replace low analysis (1-<12%) excreta deposits. It is produced in 1000 to >3,000° C. electric arc furnaces by burning black coal and white limestone in the presence of atmospheric nitrogen. Energy costs represent the bulk of calcium cyanamide production costs. Calcium cyanamide is also referred to and synonymous with lime nitrogen (LN); the term lime nitrogen or calcium cyanamide can be used interchangeably.

Commercial CaNCN also known as Nitrolime is actually a mixture of several components formed during or remaining after production of the desired calcium cyanamide compound. Additional components found in commercial calcium cyanamide include calcium oxide (CaO), graphite carbon (C), dicyandiamide [(HNCN)$_2$] and oxides of iron, aluminum, magnesium, nickel, silicon and calcium sulfate (CaSO$_4$).

As used herein, the term calcium cyanamide is synonymous with the term commercial calcium cyanamide, its components and its hydrolysis/dissolution products, unless it is clear from the context that the compound calcium cyanamide itself is intended. However, it should be recognized that the terms calcium cyanamide and commercial calcium cyanamide encompass calcium cyanamide materials where additional components of commercial calcium cyanamide such as carbon, calcium oxide, dicyandiamide are absent, subject to components derived from component lime, or are present in amounts different from typical commercial calcium cyanamide. These terms also encompass calcium cyanamide materials that have additional nitrogen-containing compounds and/or non-nitrogen plant nutrients. Furthermore, it should be understood that certain embodiments of the composition and method of the disclosure may be utilized to activate and stabilize the products of water dissolution of the individual components typically found in commercial calcium cyanamide, including, for example, dicyandiamide.

Typically, for one reason or another, commercial calcium cyanamide is treated to alter the form of cyanamide or remove components remaining after manufacture. For example, because calcium cyanamide is a slow acting fertilizer that is sparingly soluble in water, it is often factory converted to water-soluble molecular cyanamide (H$_2$NCN), which is faster acting and a higher analysis source of nitrogen. In this process, calcium cyanamide is forced to dissolve in water by precipitation of calcium ions (Ca$^{2+}$) as calcium carbonate (CaCO$_3$) and by acidification to convert initially formed cyanamide ions (HCN$^{2-}$) into acid cyanamide ion (HNCN$^-$) and then into molecular cyanamide which predominates at a pH of 4.5-5.5. Insoluble calcium carbonate and graphite carbon, which may be entrained in the calcium carbonate, are then removed by filtration. The resulting solution must be kept cool, for example, refrigerated, because it is unstable above about 70° F.

Because calcium cyanamide is slow acting, one application at a rate of up to 100 to 3000 lbs/acre lasts all growing season long. However, when calcium cyanamide is applied at these typical season long rates, particularly in cool and or dry conditions, it is necessary to delay planting until the high concentrations of plant penetrating initial hydrolysis products of calcium cyanamide, which are toxic to seeds and seedlings (phytotoxic), dissipate. Furthermore, because calcium cyanamide in its noxiously dusty irregular granule form is difficult to calibrate, its application may be haphazard so that one part of a field may be ready for planting while others exhibit persistent phytotoxicity. The phytotoxic characteristics of calcium cyanamide also make even repeated dry applications at lower rates impractical.

For the reasons above, use of dry calcium cyanamide has decreased, and presently it is no longer used as only a fertilizer or for no longer today claims as pesticide in the United States. Worldwide, its' use is largely restricted to rice cultivation, where hot, wet conditions quickly degrade and remove other nitrogen fertilizers, such as urea, from the soil.

Calcium cyanamide is more typically converted to faster acting and higher analysis forms of nitrogen. For example, calcium cyanamide may be aerobically hydrolyzed in the presence of carbon dioxide to provide calcium free urea (42% N). Other high analysis nitrogen forms which are produced from calcium cyanamide include calcium free, dicyandiamide ((HNCN)$_2$, 66% N) and molecular cyanamide (H$_2$NCN, 66% N). These forms have found use in both agriculture and the production of many of today's industrial polymer chemicals and medicines. However, plant beneficial calcium is not a part of these products.

It would be a benefit to provide compositions and methods that exploit the slow acting nature of calcium cyanamide yet provide immediately available plant nitrogen and calcium without phytotoxic consequences. It also would be a benefit if such compositions and methods made it easier to calibrate applications of calcium cyanamide and facilitate repeated smaller applications throughout the growing season. Furthermore, it would be an advantage if these benefits were achieved at more economical rates of application and enabled more of the components that exist in commercial calcium cyanamide to be utilized.

These benefits have been partially realized by Hartmann, as described in U.S. Pat. Nos. 5,698,004, 5,976,212, and 7,785,388 B2, which are incorporated herein by reference. Contrary to teachings against fertilizing plants with the initial hydrolysis products of calcium cyanamide (because of their phytotoxicity), Hartmann has worked to provide easily deliverable, stable, hydrolyzed ionic CaNCN solutions, containing plant penetrating acid cyanamide anions directly to plants. Caustic can be added to such ionic solutions to maintain a pH that favors the acid cyanamide ion. The calcium cyanamide solutions taught in these prior patents are sprayable if insolubles, such as calcium carbonate and residual carbon, are removed by a means of filtration. Balls and clumps of calcium carbonate that entrain otherwise sprayable carbon tend to plug pumping and spraying equipment. Because carbon is also beneficial to plants, microorganisms and soils it would be advantageous if methods existed to prevent formation of balls and clumps of it, so that more calcium remained soluble, filtration was unnecessary, and the residual insoluble carbon found in commercial calcium cyanamide could be maintained in an easily sprayable form, because even some sprayables are not easy to spray without adjutants and or more water. Furthermore, it would be a benefit if it were possible to maintain a pH favorable to acid cyanamide ions without having to add caustic to overcome the tendency of these solutions to drop in pH and form dicyandiamide within pH range between 8 and 10.

When calcium cyanamide first hydrolyzes in water it produces calcium ions (Ca$^{2+}$) and cyanamide ions (HCN$^{2-}$) as products. The cyanamide ion is very basic and reacts with water to form the acid cyanamide ion (HNCN$^-$). The acid cyanamide ion is amphoteric, i.e. it can act as either an acid or a base. If the acid cyanamide ion acts as an acid it will revert to the cyanamide ion, and if it acts as a base it will react to form molecular cyanamide (H$_2$NCN). The form that cyanamide takes in solution will depend upon the pH of the solution, but molecular cyanamide is favored at pHs below 10.3, which are typical of soils. Molecular cyanamide may then undergo hydrolysis to form dicyandiamide (C$_2$H$_4$N$_4$) and then urea, which may further react to form volatile ammonia and then ammonium molecules, which may further be converted to nitrate.

As stated previously, the acid cyanamide ion is plant and organism penetrating. Once absorbed by plants, the acid cyanamide ion lasts only 2-4 hours before it forms urea, which lasts 4-8 hours. Both urea and acid cyanamide stimulate plant arginine production in plants, which is related to plant health (see for example, Kunz et. al., *Zeitschrift fur*

*Plantzen Krankheiten and Flanzenschutz*, 61: 481-521, 1954; Lovatt et. al., *Proceedings California Plant and Soil Conference* 1992 & 1995; Wunsch et. al., *Zeitshrift fur Pflanzenphysiology*, 72: 359-366, 1974; and Von Fishbeck et. al., *Zeitschrift fur Planzen Krankheiten*, 71: 24-34, 1964). Therefore, compositions and methods that stabilize and provide urea and acid cyanamide ions to plants-are desirable-toward producing fruitful, parasite-free, disease-free, healthy plants. For example, recently discovered, aphids and other sucking insects have no pancreas to convert sugar, therefore they die. The inventor applied disclosed CaNCN solution sprays on plants or in the soil and observed thick, brighter shinier leaves that remain fungus and insect free.

When CaNCN is applied at fertilizer rates, atop warm, wet soil, rapid uncontrollable aerobic hydrolysis occurs, moving initially soluble calcium to insoluble calcium forms and cyanamide ions to urea, then to dicyandiamide, and then to urea and then to gaseous ammonia at that location. A need is thus seen to economically stabilize initial pre-hydrolysis soluble acid cyanamide ions and calcium ions in high dilutions so that they can rapidly percolate to target sites of choice where the ions can be absorbed by plants and aid in maintaining soil porosity.

Dissolved acid: An acid in solution. In some examples, a disclosed fluid compound includes a dissolved acid, such as nitric acid, phosphoric acid, a weak carbonic acid or a combination thereof.

Excreta: Waste matter discharged from the body. In some examples, excreta is manure, such as liquidized manure.

Gypsum: A sulfate mineral composed of calcium sulfate dehydrate, with the chemical formula $CaSO_4.2H_2O$. In some embodiments, a disclosed fluid composition includes gypsum.

Insoluble or weakly soluble high pH calcium-formed plant nutrient compounds: A phrase to describe compounds including calcium cyanamide, gypsum, calcium carbonate, calcium chloride or combinations thereof.

Nitrogen: In its molecular form $N_2$, nitrogen makes up approximately 78% of the earth's atmosphere. Nitrogen is a component of all proteinaceous matter found in living organisms, but only a few organisms (such as nitrogen-fixing bacteria) are able to directly capture atmospheric nitrogen and add it to the biosphere.

Proteinaceous matter, contained in dead and decaying organic matter and additionally in the excreta of animals represents a vast potential source of nitrogen for growth of living organisms. However, in proteinaceous form, nitrogen is insoluble and unavailable to living organisms except through the action of decomposers, which release nitrogen in the forms of gaseous $NH_3$ and leachable $NH_4^+$, $NO_2^-$, and $NO_3^-$. These forms can be utilized by plants and allow nitrogen to reenter the living biosphere. In some examples, the disclosed compositions include nitrogen, such as in the form of nitrate.

Non-nitrogen material: A material that does not contain nitrogen. In some examples, the non-nitrogen material is a plant nutrient that does not contain nitrogen. A non-nitrogen material can include phosphorous, potassium, iron, copper, zinc, manganese, boron, magnesium, molybdenum, sulfur, nickel and mixtures thereof.

Plant nutrient: A molecule that affects plant growth. A number of molecules have been determined to be essential to plant growth including carbon, oxygen, water, primary macronutrients including nitrogen (N), phosphorus (P), potassium (K), secondary macronutrients including calcium (Ca), sulphur (S), magnesium (Mg), macronutrient Silicon (Si), and micronutrients or trace minerals (such as boron (B), chlorine (CO, manganese (Mn), iron (Fe), zinc (Zn), copper (Cu), molybdenum (Mo), nickel (Ni), selenium (Se), and sodium (Na)). The macronutrients are consumed in larger quantities and are present in plant tissue in quantities from 0.2% to 4.0% (on a dry matter weight basis). Micronutrients are present in plant tissue in quantities measured in parts per million, ranging from 5 to 200 ppm, or less than 0.02% dry weight.

Powdered-activated carbon (PAC): Traditionally, active carbons are made in particulate form as powders or fine granules less than 1.0 mm in size with an average diameter between 0.15 and 0.25 mm. Thus, they present a large surface to volume ratio with a small diffusion distance. PAC is made up of crushed or ground carbon particles, 95-100% of which will pass through a designated mesh sieve. Granular activated carbon is defined as the activated carbon retained on a 50-mesh sieve (0.297 mm) and PAC material as finer material, while American Society for Testing and Materials (ASTM) classifies particle sizes corresponding to an 80-mesh sieve (0.177 mm) and smaller as PAC. PAC is not commonly used in a dedicated vessel, due to the high head loss that would occur. PAC is generally added directly to other process units, such as raw water intakes, rapid mix basins, clarifiers, and gravity filters.

Soil Microbes or microorganisms: Soil microorganisms, including, but not limited to, bacteria, fungi, and protozoa, exist in large numbers in the soil as long as there is a carbon source for energy. A large number of bacteria in the soil exists, but because of their small size, they have a smaller biomass. Actinomycetes are a factor of 10 times smaller in number but are larger in size so they are similar in biomass to bacteria. Fungus population numbers are smaller but they dominate the soil biomass when the soil is not disturbed. Bacteria, actinomycetes, and protozoa are hardy and can tolerate more soil disturbance than fungal populations so they dominate in tilled soils while fungal and nematode populations tend to dominate in untilled or no-till soils.

Soil organic matter (SOM) is composed of the "living" (microorganisms), the "dead" (fresh residues), and the "very dead" (humus) fractions. The "very dead" or humus is the long-term SOM fraction that is thousands of years old and is resistant to decomposition. Soil organic matter has two components called the active (35%) and the passive (65%) SOM. Active SOM is composed of the "living" and "dead" fresh plant or animal material which is food for microbes and is composed of easily digested sugars and proteins. The passive SOM is resistant to decomposition by microbes and is higher in lignin.

Microbes need regular supplies of active SOM in the soil to survive in the soil. Long-term no-tilled soils have significantly greater levels of microbes, more active carbon, more SOM, and more stored carbon than conventional tilled soils. A majority of the microbes in the soil exist under starvation conditions and thus they tend to be in a dormant state, especially in tilled soils. Soil organic matter can be broken down into its component parts. One hundred grams (g) or 100 pounds (lbs) of dead plant material yields about 60-80 g (lbs) of carbon dioxide, which is released into the atmosphere. The remaining 20-40 g (lbs) of energy and nutrients is decomposed and turned into about 3-8 g (lbs) of microorganisms (the living), 3-8 g (lbs) of non-humic compounds (the dead), and 10-30 g (lbs) of humus (the very dead matter, resistant to decomposition).

Dead plant residues and plant nutrients become food for the microbes in the soil. Soil organic matter (SOM) is basically all the organic substances (anything with carbon) in the soil, both living and dead. SOM includes plants, blue green algae, microorganisms (bacteria, fungi, protozoa, nematodes, beetles, springtails, etc.) and the fresh and decomposing organic matter from plants, animals, and microorganisms. As soil microbes decompose organic residues, they slowly release nutrients back into the soil for the winter cover crops or for the preceding crop. Higher temperatures and moisture increase the destruction of SOM by increasing microbial populations in the soil. Organic residues with a low carbon to nitrogen (C:N) ratio (less than 20) are easily decomposed and nutrients are quickly released (4 to 8 weeks), while organic residue with a high C:N ratio (greater than 20) decompose slowly and the microbes will tie up soil nitrogen to decompose the residues. Protozoa and nematodes consume other microbes in the soil and release the nitrogen as ammonia, which becomes available to other microorganisms or is absorbed by plant roots.

Soil organic matter (SOM) is composed of mostly carbon but associated with the carbon is high amounts of nitrogen and sulfur from proteins, phosphorus, and potassium. Soils that are biologically active and have higher amounts of active carbon recycle and release more nutrients for plant growth than soils that are biologically inactive and contain less active organic matter. Under no-till conditions, small amounts of nutrients are released annually to provide nutrients slowly and efficiently to plant roots. However, with tillage, large amounts of nutrients can be released since the SOM is consumed and destroyed by the microbes. Since SOM levels are slow to build, the storage capacity for nutrients is decreased and excess nutrients released are often leached to surface waters. SOM is a storehouse for many plant nutrients.

Urea or carbamide: An organic compound with the chemical formula $CO(NH_2)_2$. Urea serves a role in the metabolism of nitrogen-containing compounds by animals and is the main nitrogen-containing substance in the urine of mammals. It is solid, colorless, and highly soluble in water. Dissolved in water it is neither acidic nor alkaline. The body uses it in many processes, most notably nitrogen excretion. Urea is widely used in fertilizers as a convenient source of nitrogen.

A temperature controlled oven study over 37 weekly water drenches of either urea only, 2 ratios of CaNCN/Urea or water only control through loam soil columns with water catching pots demonstrated that urea, which stayed below but near the ratios were soil amending and stayed in root zones, suggesting desirable soil and plant root targets delivery traits for delivery in irrigation systems. The water control caused soil hardening and cracks, thus dropping through to the bottom from the beginning.

Dry, water-soluble urea is a low cost, fast acting, and easily calibrated soluble nitrogen form. However, urea is recognized to undergo rapid hydrolysis, which may lead to ammonia gas release and/or losses due to nitrate leaching. Urea and excreta hydrolysis also contribute large amounts of the greenhouse gas $CO_2$. In fact, urea and decomposed proteinaceous animal excreta containing urea are now considered so environmentally threatening that farmers using such fertilizers have already been subject to fines and judgments for violation of clean water laws that regulate nitrates. It therefore would be desirable to provide compositions and methods that allow urea and animal excreta to be utilized as fertilizers without ammonia loss or rapid leaching of nitrates.

There are two basic prior approaches to simultaneously making urea-derived nitrogen available to plants for longer periods and reducing nitrate contamination. The first is to coated urea for releasing urea slowly, called slow release. The second is to slow the conversion of urea to nitrate by soil microorganisms, either by inhibiting the action of urease or inhibiting nitrification, or both.

Urea dissolution control may be accomplished by coating urea with hydrophobic substances, such as sulfur, to produce slow release granules. U.S. Pat. No. 4,081,264 to Ali exemplifies this technology. Ali describes encapsulated slow release fertilizers prepared by coating a fertilizer substrate (e.g., urea) with molten sulfur. Sulfur coated urea particles are brittle so they are often coated with a plasticizing substance, such as bitumen, to increase their mechanical strength. Finally, another coating of an inorganic material, such as talc, may be required to provide a free flowing material. While slow release granules can extend nitrogen availability throughout the growing season and reduce nitrate leaching, they are too costly for general agricultural use, especially in light of their lower nitrogen content.

Urease inhibitors serve to slow the conversion of urea to ammonium ions. Such inhibitors include phosphoric triamides, such as N-(n-butyl)thiophosphoric triamide (NBPT) (see for example U.S. Pat. No. 4,530,714). Phosphoric triamides however are difficult to handle and susceptible to decomposition. Efficient incorporation of phosphoric triamides into granular urea-containing fertilizers may be accomplished using liquid amide solvents, but use of such solvents in the granulation process increases fertilizer costs.

Nitrification inhibitors, when combined with urea, ammonia, and ammonium salt fertilizers, also can serve to reduce nitrate leaching. Known nitrification inhibitors include dicyandiamide (DCD) and N-Halamine compounds. Dicyandiamide, which is made from calcium cyanamide, and forms in soil shortly after CaNCN delivery to moist soils also functions as a nitrification inhibitor. It is however, short-lived in hot soils.

While calcium cyanamide is believed to function as both a urease and nitrification inhibitor, direct addition of calcium cyanamide to urea is dissuaded because the residual calcium form in commercial calcium cyanamide promotes ammonia volatilization, especially under wet conditions (Nianzu et al., *Fertilizer Research,* 41: 19-26, 1995).

What is needed therefore are compositions and methods that make it possible to take advantage of calcium cyanamide's potential to mitigate nitrate leaching following application of urea. Furthermore, it would be advantageous to provide compositions and methods that make it possible to combine commercial calcium cyanamide directly with urea, even in wet conditions, and preserve the calcium form component of the calcium cyanamide and/or its water dissolution products. Disclosed is calcium cyanamide's carbon to activated or active carbon that more easily feeds soil microbes that thus will harbor nitrogen and other plant nutrients, that root hairs mine from them as they need it. The microbes continue to hold nitrogen, phosphorous and other nutrients for growing plant roots to consume, preventing waste and loss to water environments.

Urea ammonium nitrate (UAN) is a solution of urea and ammonium nitrate in water used as a fertilizer. The combination of urea and ammonium nitrate has an extremely low critical relative humidity (18% at 30° C.) and is used in liquid fertilizers. The most commonly used grade of these fertilizer solutions is UAN 32-0-0 (32% N) also known as UAN32 or UAN-32, which includes 50% urea, 25% ammonium nitrogen and 25% nitrate nitrogen and 20% water. Other grades are UAN 28 (includes 40% ammonium nitrate, 30% urea and 30% water), UAN 30 (includes 42% ammonium nitrate, 33% urea and 30% water) and UAN 18. The solutions are corrosive towards mild steel (up to 500 MPY on C1010 steel) and are therefore generally equipped with a corrosion inhibitor to protect tanks, pipelines, nozzles, etc., or processed as herein newly disclosed to prevent such corrosive activity.

IV. Fluid Ionized Compositions

Disclosed herein are fluid ionized compositions, such as fluid calcium cyanamide fertilizer compositions. In some embodiments, a fluid composition includes a mixture of about 40 to 20 parts, such as 35 to 25 parts, 30 to 20 parts, including 40 parts, 39 parts, 38 parts, 37 parts, 36 parts, 35 parts, 34 parts, 33 parts, 32 parts, 31 parts, 30 parts, 29 parts, 28 parts, 27 parts, 26 parts, 25 parts, 24 parts, 23 parts, 22 parts, 21 parts, or 20 parts of dissolved acid or acid-formed approximately neutral pH nitrogen plant nutrient compounds and about 1 to about 10 parts, such as about 2 to 8 parts, about 3 to 7 parts, about 1 to about 5 parts, including 1 part, 2 parts, 3 parts, 4 parts, or 5 parts of a mixture of insoluble or weakly soluble high pH calcium-formed plant nutrient compounds. In some examples, the dissolved acid comprises nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, ammonium phosphate, high pH aqueous ammonia or combinations thereof; and the insoluble or weakly soluble high pH calcium-formed plant nutrient compounds are in solution and comprise calcium cyanamide, gypsum, calcium carbonate, calcium chloride or combinations thereof.

In some examples, the $H_2O$ present in the fluid composition comprises less than 14× the mass of the insoluble or weakly soluble high pH calcium formed plant nutrient compounds in the mixture, such as about 13λ, about 12λ, about 11λ, about 10×, about 9×, about 8×, about 7×, including 13×, 12×, 11×, 10×, 9×, 8×, 7× the mass of the insoluble or weakly soluble high pH calcium formed plant nutrient compounds in the mixture. In some embodiments, a composition including $H_2O$ less than 14× the mass of the insoluble or weakly soluble high pH calcium formed plant nutrient compounds in the mixture is denoted as a concentrate. In some embodiments, the $H_2O$ present in the fluid mixture comprises at least 14×, such as about 14×, about 15×, about 16×, about 17×, about 18×, about 19×, about 20×, about 21×, about 22×, about 23×, about 24×, about 25×, about 26×, about 27×, about 28×, about 29×, about 30×, including 14×, 15×, 16×, 17×, 18×, 19×, 20×, 21×, 22×, 23×, 24×, 25×, 26×, 27×, 28×, 29×, 30× the mass of the insoluble or weakly soluble high pH calcium formed plant nutrient compounds in the mixture. In some examples, a composition including $H_2O$ at least 14× the mass of the mass of the insoluble or weakly soluble high pH calcium formed plant nutrient compounds in the mixture is prepared by diluting a concentrate.

In some examples, the insoluble or weakly soluble high pH calcium-formed plant nutrient compounds are in solution and ranges from about 0.1% by weight to less than about 30% by weight, more preferably from about 0.1% to less than about 20% by weight, even more preferably from about 0.1% to less than about 10% by weight, and typically between 5% to 10%, such as about 7% and about 8%, including about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, by weight.

In some examples, a disclosed composition includes dissolved acid or acid-formed approximately neutral pH nitrogen plant nutrient compounds including a urea ammonium nitrate (UAN), where the UAN solution comprises about 20% to about 40% urea, such as about 30% to about 35% urea, including 20%, 21%, 22%, 23%, 24%, 25%, 26%, 27%, 28%, 29%, 30%, 31%, 32%, 33%, 34%, 35%, 36%, 37%, 38%, 39%, 40% of urea, about 30% to about 55% ammonium nitrate, such as about 35% to about 50%, such as about 40% to about 45% ammonium nitrate, including 35%, 36%, 37%, 38%, 39%, 40%, 41%, 42%, 43%, 44%, 45%, 46%, 47%, 48%, 49%, 50%, 51%, 52%, 53%, 54%, 55% of ammonium nitrate with the residual as $H_2O$; and the insoluble or weakly soluble high pH calcium-formed plant nutrient compounds are in a solution comprising $H_2O$ and comprise calcium cyanamide. In some embodiments, the $H_2O$ present in the fluid mixture comprises less than 14× the mass of calcium cyanamide, such as about 13×, about 12×, about 11×, about 10×, about 9×, about 8×, about 7×, including 13×, 12×, 11×, 10×, 9×, 8×, 7× the mass of the calcium cyanamide in the mixture. In some examples, a composition including $H_2O$ present in the fluid mixture less than 14× is denoted as a concentrate. In some embodiments, the $H_2O$ present in the fluid mixture comprises at least 14×, such as about 14×, about 15×, about 16×, about 17×, about 18×, about 19×, about 20×, about 21×, about 22×, about 23×, about 24×, about 25×, about 26×, about 27×, about 28×, about 29×, about 30×, including 14×, 15×, 16×, 17×, 18×, 19×, 20×, 21×, 22×, 23×, 24×, 25×, 26×, 27×, 28×, 29×, 30× the mass of the calcium cyanamide. In some examples, a composition including $H_2O$ at least 14× the mass of calcium cyanamide is prepared by diluting a concentrate.

In some examples, a disclosed composition includes calcium cyanamide from about 0.1% by weight to less than about 30% by weight, more preferably from about 0.1% to less than about 20% by weight, even more preferably from about 0.1% to less than about 10% by weight, and typically between 5% to 10%, such as about 7% and about 8%, including about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, by weight.

In some examples, a disclosed composition further includes excreta, such as liquidized excreta (e.g., an aqueous manure slurry). In some examples, the excreta is animal excreta, such as dairy or swine excreta.

In some embodiments, the disclosed composition includes from about 0.01 percent calcium cyanamide to about 99.99 percent UAN solution and from about 0.1 percent to about 99.9 percent fluid excreta.

In some embodiments, the disclosed composition includes about 25 percent calcium cyanamide, 25 percent to about 50 percent UAN solution and from about 50 percent to about 25 percent excreta.

It is possible to include other plant fertilizing materials, nutrients and soil amendments in embodiments of the compositions of the present disclosure. Other plant fertilizers, nutrients and soil amendments include, but are not limited to, phosphorous, potassium, iron, copper, zinc, manganese, sulfur, boron, magnesium, molybdenum, and mixtures thereof. A more exhaustive list of plant nutrients, including micronutrients, is found in the official publication of the Association of American Plant Food Control Officials (AAPFCO), volume 53, 2000 or later, which is incorporated herein by reference.

In some examples, a disclosed composition includes at least one non-nitrogen material to the mixture, such as a plant nutrient. In some examples, the non-nitrogen material includes phosphorous, potassium, iron, copper, zinc, manganese, boron, magnesium, molybdenum, sulfur, nickel, and mixtures thereof.

In some examples, a disclosed composition includes an electrolytic suspension agent, such as an ionized metal element, such as silicon, iron, aluminum, carbon or a combination thereof.

In some examples, the approximately neutral pH nitrogen plant nutrient compound mixture includes a pH of about 7.4 and about 8, such as about 7.6 and about 7.9, such as about 7.8 and 7.9. such as about 7.4, about 7.5, about 7.6, about 7.7, about 7.8, about 7.9 or about 8.

In some examples, a disclosed composition includes particles of with an about 60 to about 240 mesh pass through, such as about 80 to about 200 mesh pass through, such about 60, about 80, about 100, about 120, about 180, about 200 mesh pass through.

Compositions of the present disclosure can be prepared, transported, sold and stored in containers. Prior disclosures required that calcium cyanamide fertilizers be prepared and maintained in the absence of aeration to prevent soluble calcium ions forming inactive $CaCO_3$. In particular, aeration of the mixture was inhibited, for example, by forming the mixture in a container, where the container also held a gas, such as nitrogen, argon, ammonia, acetylene, and mixtures thereof, that serves to inhibit gas exchange between the container and the atmosphere. It has been surprisingly determined herein that the disclosed compositions do not need be prepared or maintained in sealed containers, and in fact, can be exposed to air, or other gas, including carbon dioxide (which is accelerated by open-air agitation) without causing soluble calcium ions to form inactive $CaCO_3$.

V. Methods of Making a Fluid Ionized Composition

Methods of making a disclosed fluid ionized composition are provided. In some examples, a method of making a fluid composition includes combining a mixture of about 40 to 20 parts, such as 35 to 25 parts, 30 to 20 parts, including 40 parts, 39 parts, 38 parts, 37 parts, 36 parts, 35 parts, 34 parts, 33 parts, 32 parts, 31 parts, 30 parts, 29 parts, 28 parts, 27 parts, 26 parts, 25 parts, 24 parts, 23 parts, 22 parts, 21 parts, or 20 parts of dissolved acid or acid-formed approximately neutral pH nitrogen plant nutrient compounds and about 1 to about 10 parts, such as about 2 to 8 parts, about 3 to 7 parts, about 1 to about 5 parts, including 1 part, 2 parts, 3 parts, 4 parts, or 5 parts of a mixture of insoluble or weakly soluble high pH calcium-formed plant nutrient compounds, thereby forming a fluid composition. In some examples, the dissolved acid comprises nitric acid, phosphoric acid, a weak carbonic acid or a combination thereof and the acid-formed nitrogen plant nutrient compound comprises ammonium nitrate, calcium nitrate, urea ammonium nitrate, calcium ammonium nitrate, ammonium phosphate, high pH aqueous ammonia or combinations thereof and the insoluble or weakly soluble high pH calcium-formed plant nutrient compounds comprise calcium cyanamide, gypsum, calcium carbonate, calcium chloride or combinations thereof.

In some examples, the approximately neutral pH nitrogen plant nutrient compound mixture has a pH of about 7.4 and about 8, such as about 7.6 and about 7.9, such as about 7.8 and 7.9. such as about 7.4, about 7.5, about 7.6, about 7.7, about 7.8, about 7.9 or about 8.

In some examples, $H_2O$ is added to the mixture so that the resulting fluid composition comprises less than 14× the mass of the insoluble or weakly soluble high pH calcium formed plant nutrient compounds in the mixture, such as about 13×, about 12×, about 11×, about 10×, about 9×, about 8×, about 7×, including 13×, 12×, 11×, 10×, 9×, 8×, 7× the mass of the insoluble or weakly soluble high pH calcium formed plant nutrient compounds in the mixture. In some examples, a concentrate of a disclosed composition is prepared by including $H_2O$ less than 14× the mass of the insoluble or weakly soluble high pH calcium formed plant nutrient compounds in the mixture.

In some examples, $H_2O$ is added to the mixture so that the resulting fluid composition comprises at least 14×, such as about 14×, about 15×, about 16×, about 17×, about 18×, about 19×, about 20×, about 21×, about 22×, about 23×, about 24×, about 25×, about 26×, about 27×, about 28×, about 29×, about 30×, including 14×, 15×, 16×, 17×, 18×, 19×, 20×, 21×, 22×, 23×, 24×, 25×, 26×, 27×, 28×, 29×, 30× the mass of the insoluble or weakly soluble high pH calcium formed plant nutrient compounds in the mixture. In some examples, a composition including $H_2O$ at least 14× the mass of the mass of the insoluble or weakly soluble high pH calcium-formed plant nutrient compounds in the mixture is prepared by adding the desired amount of $H_2O$ to a prepared concentrate.

In some examples, fluid compositions are prepared by adding the insoluble or weakly soluble high pH calcium-formed plant nutrient compounds to a solution, ranging from about 0.1% by weight to less than about 30% by weight, more preferably from about 0.1% to less than about 20% by weight, even more preferably from about 0.1% to less than about 10% by weight, and typically between 5% to 10%, such as about 7% and about 8%, including about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, by weight.

In some examples, a disclosed composition which includes urea ammonium nitrate (UAN) is prepared by combining a UAN solution comprising about 20% to about 40% urea, such as about 30% to about 35% urea, including 20%, 21%, 22%, 23%, 24%, 25%, 26%, 27%, 28%, 29%, 30%, 31%, 32%, 33%, 34%, 35%, 36%, 37%, 38%, 39%, 40% of urea, about 30% to about 55% ammonium nitrate, such as about 35% to about 50%, such as about 40% to about 45% ammonium nitrate, including 35%, 36%, 37%, 38%, 39%, 40%, 41%, 42%, 43%, 44%, 45%, 46%, 47%, 48%, 49%, 50%, 51%, 52%, 53%, 54%, 55% of ammonium nitrate with $H_2O$ and calcium cyanamide. In some examples, the fluid composition is prepared so that $H_2O$ is less than 14× the mass of calcium cyanamide, such as about 13×, about 12×, about 11×, about 10×, about 9×, about 8×, about 7×, including 13×, 12×, 11×, 10×, 9×, 8×, 7× the mass of the calcium cyanamide in the composition. In some examples, a concentrate of a fluid composition including calcium cyanamide is prepared by adding $H_2O$ at a volume so that it is less than 14× the mass of calcium cyanamide.

In some examples, the $H_2O$ is added to a fluid mixture including calcium cyanamide so that the $H_2O$ is at least 14× the mass of calcium cyanamide, such as about 14×, about 15×, about 16×, about 17×, about 18×, about 19×, about 20×, about 21×, about 22×, about 23×, about 24×, about 25×, about 26×, about 27×, about 28×, about 29×, about 30×, including 14×, 15×, 16×, 17×, 18×, 19×, 20×, 21×, 22×, 23×, 24×, 25×, 26×, 27×, 28×, 29×, or 30× the mass of calcium cyanamide. In some examples, a composition including $H_2O$ at least 14× the mass of calcium cyanamide is prepared by diluting a concentrate.

In some examples, a disclosed composition is prepared by adding calcium cyanamide from about 0.1% by weight to less than about 30% by weight, more preferably from about 0.1% to less than about 20% by weight, even more preferably from about 0.1% to less than about 10% by weight, and typically between 5% to 10%, such as about 7% and about 8%, including about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, by weight to a solution including $H_2O$ and UAN.

In some examples, excreta, such as liquidized excreta (including, but not limited to dairy excreta), is combined with a mixture comprising about 40 to 20 parts of dissolved acid or acid-formed approximately neutral pH nitrogen plant nutrient compounds to about 1 to about 5 parts of a mixture of insoluble or weakly soluble high pH calcium-formed plant nutrient compounds, where the dissolved acid includes nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, ammonium phosphate, high pH aqueous ammonia or combinations thereof and the insoluble or weakly soluble high pH calcium-formed plant nutrient compounds are in solution and comprise calcium cyanamide, gypsum, calcium carbonate, calcium chloride or combinations thereof, thereby forming a fluid composition.

In some examples, other plant fertilizing materials, nutrients and soil amendments are combined with a disclosed fluid composition. Other plant fertilizers, nutrients and soil amendments include, but are not limited to, phosphorous, potassium, iron, copper, zinc, manganese, sulfur, boron, magnesium, molybdenum, and mixtures thereof.

In some examples, at least one non-nitrogen material, such as a plant nutrient, is added to the fluid mixture. In some examples, non-nitrogen materials, such as phosphorous, potassium, iron, copper, zinc, manganese, boron, magnesium, molybdenum, sulfur, nickel, or mixtures thereof are added to the mixture.

In some examples, an electrolytic suspension agent is added to the mixture. Exemplary electrolytic suspension agents include, but are not limited to, ionized metal elements, such as silicon, iron, aluminum, carbon or a combination thereof.

In some examples, a disclosed composition is prepared to yield particles with an about 60 to about 240 mesh pass through size, such as about 80 to about 200 mesh pass through, such about 60, about 80 about 100, about 120, about 180, about 200 mesh pass through size.

In some examples of the method of making, the combining is performed in the presence of a circulation process. It is contemplated that any circulation process known to one of skill in the art may be used to prepare the fluid compositions. In some examples, a venturi by-pass system or other like intensive blending system is used to prepare a disclosed fluid composition.

The disclosed methods can be performed in an opened vessel or a closed vessel. The efficiency of the method is not dependent upon the absence of atmospheric gases, such as $CO_2$. Further, no additives or heat are required to maintain the fluid state of the compositions. In some examples, the method is performed in an opened container. In some examples, the method is performed in an unsealed container. In some examples, the method is performed in the presence of atmospheric $CO_2$. In some examples, the method of making is performed in an opened container, an unsealed container, and/or in the presence of atmospheric $CO_2$. While the method may be performed in a closed container, it is not required.

In some examples, the method of making further includes dehydrating the fertilizer composition to form a solid. By forming the disclosed liquid compositions, such as fluid compositions comprising calcium cyanamide, and dehydrating them, it is possible to provide solids that contain the initial dissolution and hydrolysis products of calcium cyanamide in a readily dissolvable, calibrateable, and stable form.

Processes for dehydration of liquid compositions to provide solid materials are well known in the chemical and fertilizer arts. In its simplest form, water from an aqueous composition can simply be allowed to evaporate. It is possible to accelerate the evaporation process by using a vacuum, by bubbling a gas, such as an inert gas, through the composition, or by allowing the composition to evaporate under a protective blanket of inert gas, for example argon. Heat can also be employed to stimulate evaporation. Freeze-drying of aqueous compositions is another alternative. During freeze drying, a vacuum is used to sublime water from the frozen liquid composition. Dehydration equipment is available from MCD Technologies (Tacoma, Wash.).

VI. Methods of Use

Disclosed herein are methods of using the provided fluid ionized compositions. These uses include agricultural uses, such as fertilizing and/or soil amending compositions (such as increasing soil base of beneficial microbes) as well as for disinfecting and controlling odors of certain materials, including fertilizing and/or waste materials, such as, without limitation, human waste effluents, livestock manure and waste effluents, garbage, oils, plant materials, such as vegetable waste, and paper processing materials. While not limiting the present disclosure to a particular theory of operation, it is believed that the disclosed synergistic compositions derive their efficacy in large part from a stabilization of the bioactive acid cyanamide ion and soluble calcium such as provided by calcium cyanamide and gypsum $CaSO_4.2H_2O$. In addition, the efficacy of the synergistic compositions may derive from the discovery of the ability of these compositions to enhance soil permeability and allow percolation of the bioactive cyanamide ion and soluble calcium ions into plants at or above ground level and deep into the soil for root uptake.

Using the methods described herein as fertilizing and soil amending compositions, or as odor-controlling and disinfecting compositions, typically comprises (1) forming the compositions, and (2) applying the compositions to various materials and/or locations, such as odiferous materials, particularly human and animal wastes and fluids, slaughterhouse wastes, or agricultural plots. The compositions are formed as described above. Once formed, the compositions can be applied to odiferous materials and/or agricultural plots by any suitable method, including by hand or using conventional spraying or irrigation techniques. In some examples, the disclosed compositions are applied as aqueous dispersions, including both suspensions and filtered solutions. For example, a concentrate composition may be diluted to a desired concentration by adding an additional solvent, such as H$_2$O, mixed, decanted and/or filtered as desired, and thereafter applied to agricultural plots, such as by using conventional spraying and irrigation injection devices. The disclosed compositions provide a distinct advantage in that spraying devices can conveniently be used without the heretofore ubiquitous clogging problems associated with using the conventional, substantially large particles of calcium cyanamide or those which required aeration inhibition.

In particular, methods of treating excreta, methods of enhancing plant growth and methods of digesting insoluble or weakly soluble high pH calcium-formed plant nutrient compounds are disclosed.

i. Methods of Treating Excreta

In some examples, methods of treating excreta can include adding an effective amount of a disclosed fluid composition such as those described in detail in Section IV to excreta, such as animal excreta. In some examples, an effective amount is one in which the H$_2$O present in the fluid composition comprises at least 14× the mass of the insoluble or weakly soluble high pH calcium formed plant nutrient compounds. The disclosed methods can be used to treat excreta, such as animal excreta, in various forms including liquidized manure. In some examples, the excreta is dairy, swine or chicken.

In some examples, the method further includes adding at least one non-nitrogen material to the mixture, such as a plant nutrient. In some embodiments, the non-nitrogen material is selected from the group consisting of phosphorous, potassium, iron, copper, zinc, manganese, boron, magnesium, molybdenum, sulfur, nickel, and mixtures thereof.

In some examples, the method further includes adding an electrolytic suspension agent to the mixture, such as an ionized metal element, such as silicon, iron, aluminum, carbon or a combination thereof.

In some examples, the approximately neutral pH nitrogen plant nutrient compound mixture has a pH of about 7.8 and 7.9.

In some examples, the fluid composition comprises particles of with an about 60 to about 100 mesh pass through screen size, such as about 80 to about 100 mesh pass through screen size.

In some examples, the method of treating excreta further includes applying the mixture to plants, soils or mediums through an irrigation system, for example a fertigation/nitrigation system. In some examples, the method of treating excreta includes applying a disclosed composition to the soils, plants or mediums including excreta by spraying.

In some examples, the method of treating excreta includes treating municipal effluent waste, for example in treatment facilities.

ii. Methods of Enhancing Plant Growth

Methods of enhancing plant growth are disclosed. In some examples, a method of enhancing plant growth includes applying an effective amount of a disclosed fluid composition in which the H$_2$O present in the fluid composition comprises at least 14× the mass of the insoluble or weakly soluble high pH calcium formed plant nutrient compounds to soil prior to, during and/or after planting, thereby enhancing plant growth.

In some embodiments, applying an effective amount comprises applying the composition to plants, soils or mediums through an irrigation system, for example a fertigation/nitrigation or drip system. In some examples, the method of enhancing plant growth comprises applying an effective amount of a disclosed composition to the soils, plants or mediums including excreta by spraying.

In some embodiments, methods of enhancing plant growth comprise applying quantum harmonic resonance for molecular and electron spin for a dextrorotary bias to increase compatibility with biological systems (QHR) or mechanical method of imparting a heavy/complete dextrorotary bias to molecular and electron spin to increase compatibility with biological systems (MDB) to the disclosed compositions in vessels of the disclosed compositions. Thus, methods of modulating the electron spin of elements within a fluid composition are also disclosed. In some embodiments, methods of enhancing plant growth comprise exposing the plants to sound, such as audible, low frequency sound of less than 4000 Hertz, prior to, during, and/or following treatment with one or more of the disclosed fluid compositions. For example, the frequency of the sound is selected to enhance plant leaf pore opening.

iii. Methods of Digesting Insoluble or Weakly Soluble High pH Calcium-Formed Plant Nutrient Compounds Methods of digesting insoluble or weakly soluble high pH calcium-formed plant nutrients to form ionized calcium compounds are disclosed. In some embodiments, a method of digesting insoluble or weakly soluble high pH calcium-formed plant nutrient compounds to form ionized calcium compounds includes combining a mixture of about 40 to about 20 parts of dissolved acid or acid-formed approximately neutral pH nitrogen plant nutrient compounds to about 1 to about 5 parts of a mixture of insoluble or weakly soluble high pH calcium-formed plant nutrient compounds, where the dissolved acid comprising nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, ammonium phosphate, high pH aqueous ammonia or combinations thereof and hydrolyze the insoluble or weakly soluble high pH calcium-formed plant nutrient compounds in solution which comprise calcium cyanamide, gypsum, calcium carbonate, calcium chloride or combinations thereof, thereby forming ionized calcium compounds and insoluble carbon.

In some examples of the method of digesting, the mixture of insoluble or weakly soluble high pH calcium-formed plant nutrient compounds includes calcium cyanamide.

In some examples of the method of digesting, the combining is performed in the presence of a circulation process, such as a venturi by-pass system or other like intensive blending system.

In some embodiments, the method further comprises applying sound.

iv. Methods of Digesting Proteinaceous Matter

Methods of digesting proteinaceous matter are disclosed. In some embodiments, a method of digesting proteinaceous matter is a method for alkaline digestion of proteinaceous matter by using ammonia in water. In some examples, proteinaceous matter is a plant, a plant part or a plant seed. In some examples, the method includes forming ammonia by hydrolyzing urea in water. For instance, calcium cyanamide is used to hydrolyze urea in water. In some examples, the method includes using calcium cyanamide comprising calcium to hydrolyze urea in water. In some examples, the calcium within the calcium cyanamide is employed to hydrolyze the urea in urea ammonium nitrate.

In some examples of the method of digesting, the combining is performed in the presence of a circulation process, such as a venturi MDB by-pass circulation system or the QHR resonance system or other like intensive blending systems.

Urea is produced by compressing $CO_2$ with ammonia ($NH_3$). Fluid Urea Ammonium Nitrate UAN comprises water in percentages from 30 to 20% as to the concentration of urea and ammonium nitrate dissolved in water to comprise 28% or 32% nitrogen.

In the present disclosure calcium cyanamide is hydrolyzed in a vessel of fluid UAN comprising water. That creates soluble ionic calcium, which aggressively hydrolyses urea in water back to its original components of ammonia and $CO_2$. Typically and with this process UAN can have ammonia.

This disclosure also describes ammonium being hydrolyzed, disassociated or separated away from its original component nitric acid, which can further digest calcium from calcium cyanamide's other calcium compounds and metal nutrients compounds creating other soluble ionic nutrient forms. Importantly, this includes digesting calcium canamide's free graphite carbon to very active carbon, easily absorbed and digested by soil microbes that depend on their energy coming from carbon, when the mixture compositions are applied to the soil for farming.

This disclosure further discloses a method of pumping through a MDB by-pass circulation system that pounds all the disclosed compounds together in a blending process. This particle pounding mechanism helps digest the particles in all of calcium cyanamide's components or any other nutrients compounds added to the mixture. This creates solution grade sprayable fluid ionic calcium cyanamide that contains ammonia.

v. Methods of Digesting Free Carbon into Solution Grade to Enhance Soil Microbes' Carbon Consumption Methods of digesting free carbon into solution grade to enhance soil microbes' carbon consumption are disclosed. In some embodiments, a method of digesting free carbon into solution grade to enhance soil microbes' carbon consumption includes using resonance QHR) or mechanical blending systems (HDB) to create activated carbon with more surface area for even more access to microbes. In some examples, the method includes applying the disclosed compositions to soil that has been tilled. In other examples, the method includes applying the disclosed compositions to soil that has not been recently tilled, such as within the past 12 months, 24 months, 36 months or more. It is contemplated that the method includes applying one or more of the disclosed compositions to the soil by any means known to one of ordinary skill in the art, including those mentioned within this disclosure.

The foregoing may be better illustrated by the following example. Other aspects and advantages of the present invention are illustrated in the example which is provided solely for purposes of illustration. The scope of the present disclosure should not be limited to those features described in this example.

EXAMPLE

This example describes various studies characterizing the disclosed fluid compositions.

Table 1 illustrates the carbon suspension levels in static jars over time. This data was created from static clear jar mixtures of CaNCN in UAN 32 and CaNCN in urea and water and grading them as to visible levels of carbon from CaNCN over time. FIG. 1 compares carbon black color levels in jars. Here, the UAN with less water was a more dense solution than urea in water, thus the former holds up the black CaNCN particles longer.

TABLE 1

| BLACK MINUTES | CaNCN in UAN 32 | CaNCN in UREA WATER |
|---|---|---|
| 0 | 100% | 100% |
| 5 | 100% | 80% |
| 15 | 100% | 20% |
| 30 | 100% | 10% |
| 1 Hr | 50% | 5% |
| 2 Hrs | 20% | 2% |
| 3 Hrs | 15% | 0% |
| 4 Hrs | 5% | 0% |

Figure 2:
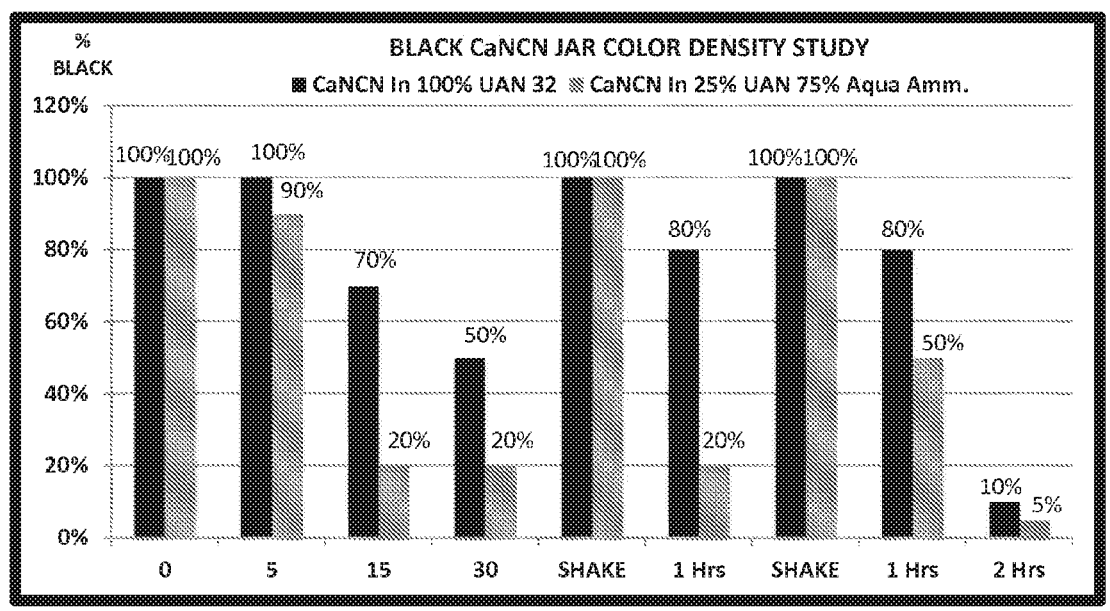
FIG. 2 is a bar graph comparing the fineness of digested particles. Here, from a strong light being shown through dense carbon black solution vessels, it appears that the alkaline aqua ammonia solution aids acid formed compounds in UAN in digesting insoluble CaNCN particles. The 75% aqua ammonia solution allows more light through sooner each time after mixing and some jar shakings, indicating finer particles.

Table 2 displays the color density of black carbon from light through jars at various time intervals. Table 2 data was created from static clear jar mixtures of CaNCN in UAN 32 and CaNCN in urea and water and grading them as to visible levels of carbon from CaNCN over time, while shining a bright light into them. The less color, the finer the colored particles are. FIG. 2 graphically compares the fineness of digested particles. Here it appears that the alkaline aqua ammonia aided acid formed compounds in UAN are digesting the black carbon CaNCN particles.

TABLE 2

| BLACK MINUTES | CaNCN in 100% UAN 32 | CaNCN in 25% UAN 75% Aqua Amm. |
|---|---|---|
| 0 | 100% | 100% |
| 5 | 100% | 90% |
| 15 | 70% | 20% |
| 30 | 50% | 20% |
| SHAKE | 100% | 100% |
| 1 Hrs | 80% | 20% |
| SHAKE | 100% | 100% |
| 1 Hrs | 80% | 50% |
| 2 Hrs | 10% | 5% |

Figure 3:
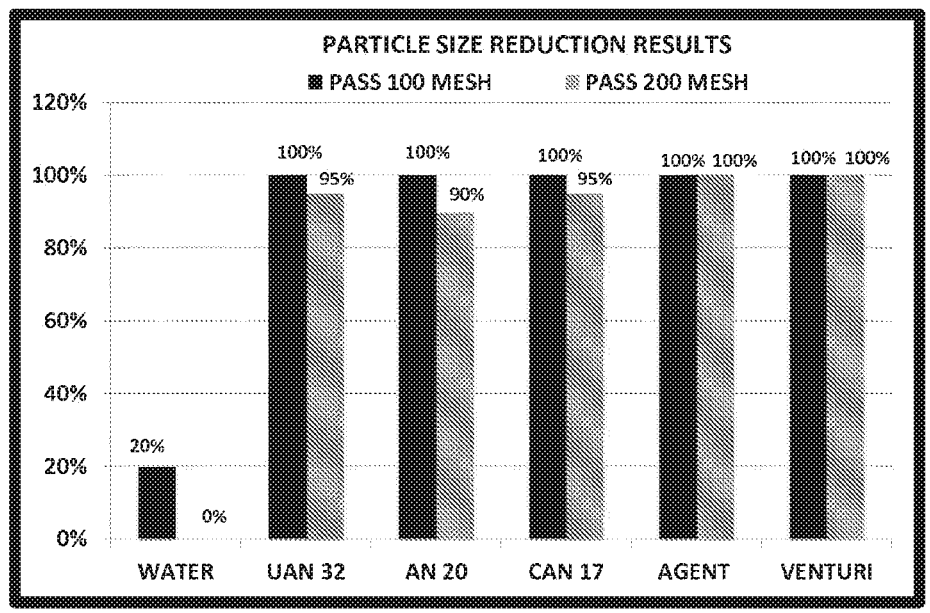
FIG. 3 is a bar graph that displays the results of CaNCN particle size reduction measured by passing through two extremely fine screenings, after mixing insoluble CaNCN in the water of the three disclosed fertilizer solutions. Then the effect of a suspension agent in them and the improved effect from using a venturi by-pass system are shown in columns 4 and 5.
Figure 4:
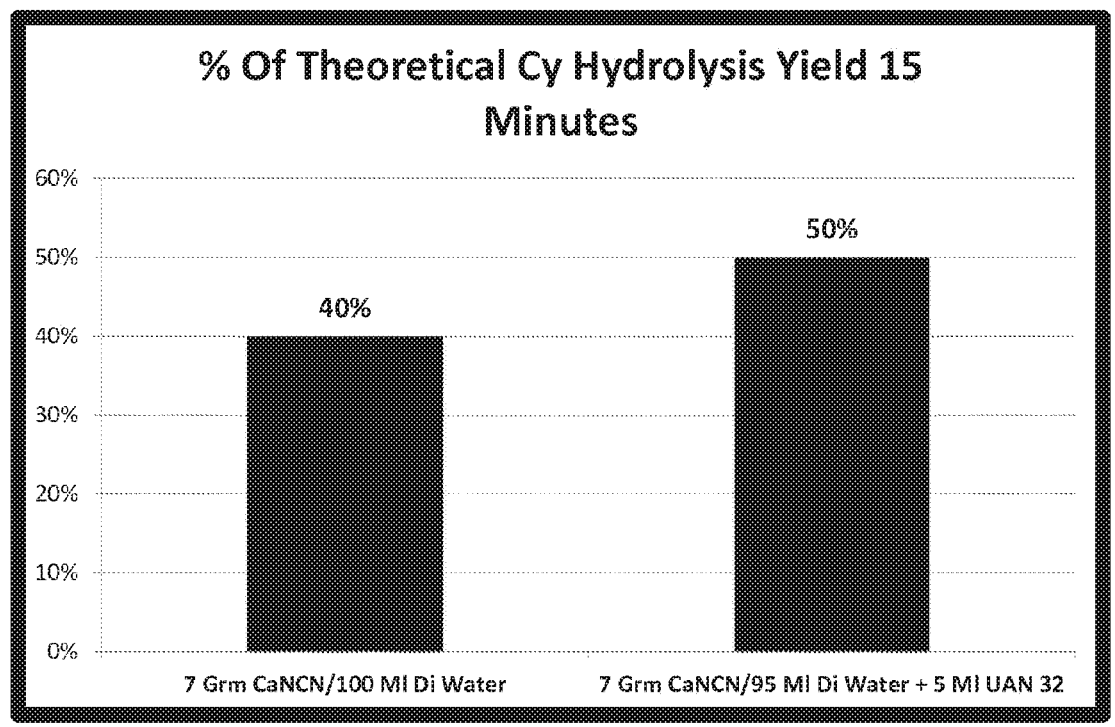
FIG. 4 is a bar graph showing enhanced CaNCN hydrolysis from as little as 5% CaNCN disclosed UAN solution, rather than the disclosed 95% added to 14$x$ water hydrolyzed CaNCN. These bars indicate an increase in the speeding up of CaNCN hydrolysis by 25% within 15 minutes.
Figure 5:
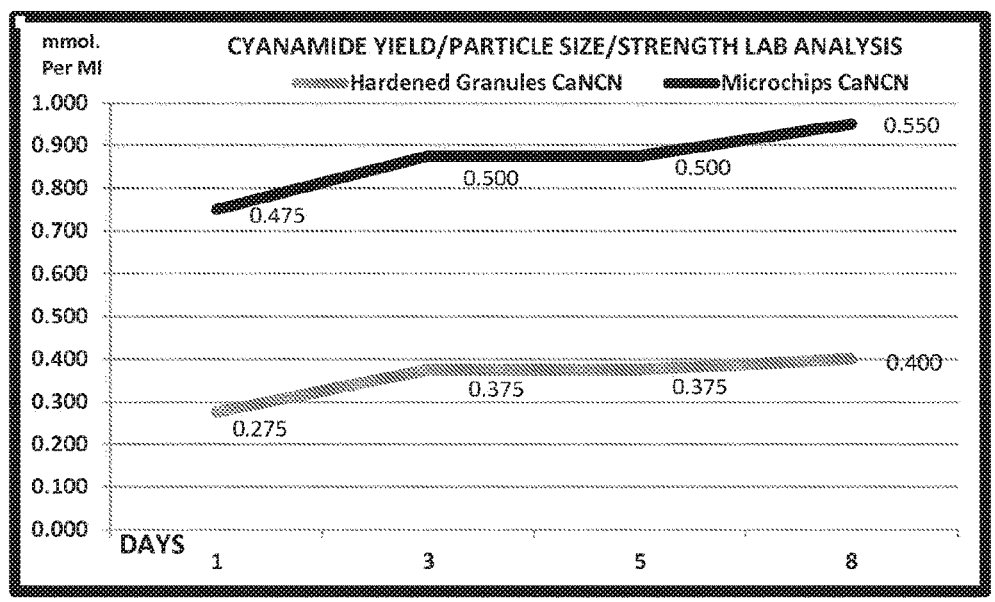
FIG. 5 is a line graph demonstrating the effect of particle hardness and size related to the speed and completion of CaNCN hydrolysis over time. This differentiates by using CaNCN hardened and enlarged granules of 1.7 mm-3.5 mm size compared to disclosed microchip powder of 0.0 to 1 mm size.

Table 3 displays particle sizes from static jar tests after passing through screen sizes. Table 3/FIG. 3 data was created from static clear jar mixtures of CaNCN in water, UAN 32, AN 20, CAN 17 and suspension agent in water judging them as to passage through 2 grades of finer screens than used in farm spraying practices. Additionally included was a screening judgment made of CaNCN in UAN from a commercial venturi MDB system. Intended was to comparatively display differences between diluents and the overall benefit from venturi MDB processing.

TABLE 3

| CaNCN IN FLUIDS | PASS 100 MESH | PASS 200 MESH |
|---|---|---|
| WATER | 20% | 5% |
| UAN 32 | 100% | 95% |
| AN 20 | 100% | 90% |
| CAN 17 | 100% | 95% |
| AGENT | 100% | 100% |
| VENTURI | 100% | 100% |

Table 4 illustrates percentage of cyanamide hydrolysis in the presence and absence of UAN by adding either 7 grams of CaNCN to 100 ml DI water or 7 grams of CaNCN to 95 ml DI water and 5 ml UAN 32. This is an addition of 5% UAN containing 20% water to a 14× water mixture to CaNCN (essentially maintaining a 7% solution) increase cyanamide yield by 25% in 15 minutes. UAN was observed to break apart the black solids to create a black solution within this short period of time. Such effect was not observed in the water only solution. This result indicates that if the CaNCN is 14× proportionately in UAN's 20% water inside UAN and thus exposed to 118× more UAN, the apparent aggressive hydrolyzation of UAN seen here can increase these results to attain full theoretical hydrolyzation within this 15 minute time limitation.

TABLE 4

|  | 7 gm CaNCN/100 ml Di Water | 7 gm CaNCN/95 ml Di Water and 5 ml UAN 32 |
|---|---|---|
| % of Cy Hydrolysis 15 min. | 40% | 50% |

Table 5 demonstrates the importance of particle hardness and size related to speed and completion of CaNCN hydrolysis over time. Table 5 data was created by lab titrations to net cyanamide yields from hardened CaNCN granules and microchips of CaNCN used in the present disclosure. This differentiates CaNCN microchip powder (0.0-0.1 mm powder) (18 to 200 mesh screen size) from commercially hardened and enlarged granules (1.7-3.5 mm) (12 to 5.5 mesh screen size).

TABLE 5

| CY YIELDS DAYS | Hardened Granules CaNCN | Microchips CaNCN |
|---|---|---|
| 1 | 0.275 | 0.475 |
| 3 | 0.375 | 0.500 |
| 5 | 0.375 | 0.500 |
| 8 | 0.400 | 0.550 |

Figure 6:
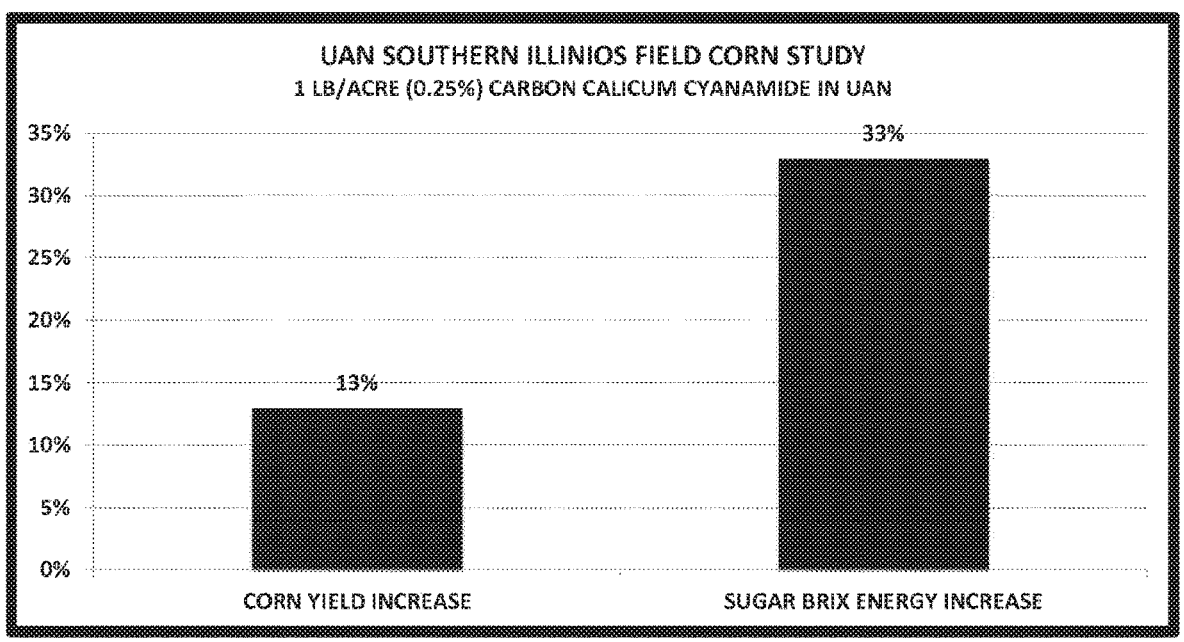
FIG. 6 is a bar graph showing the field corn yield and sugar brix energy increases of 13% and 33% from fluid 0.5% CaNCN in 99.5% disclosed stabilized UAN 32 over standard fluid UAN 32, in triple replicated field corn nitrogen fertilized studies. These are averages from 60-120-180 lbs nitrogen/acre.

Table 6 and FIG. 6 illustrate the field corn yield and sugar increases from fluid 0.5% CaNCN Stabilized UAN 32 over standard fluid UAN 32, in Arise Research and Discovery Station, Martinsville, Ill., triple replicated field corn nitrogen fertilized studies. These are averages over 60-120-180 lbs Nitrogen/acre. Three field corn studies that included yields and chlorophyll related plant sap sugar brix studies were performed.

TABLE 6

| YIELD/SUGAR PERCENTS | YIELD INCREASE | SUGAR BRIX INCREASE |
|---|---|---|
| 0.25% CaNCN/UAN 32 | 13% | 33% |

Figure 7:
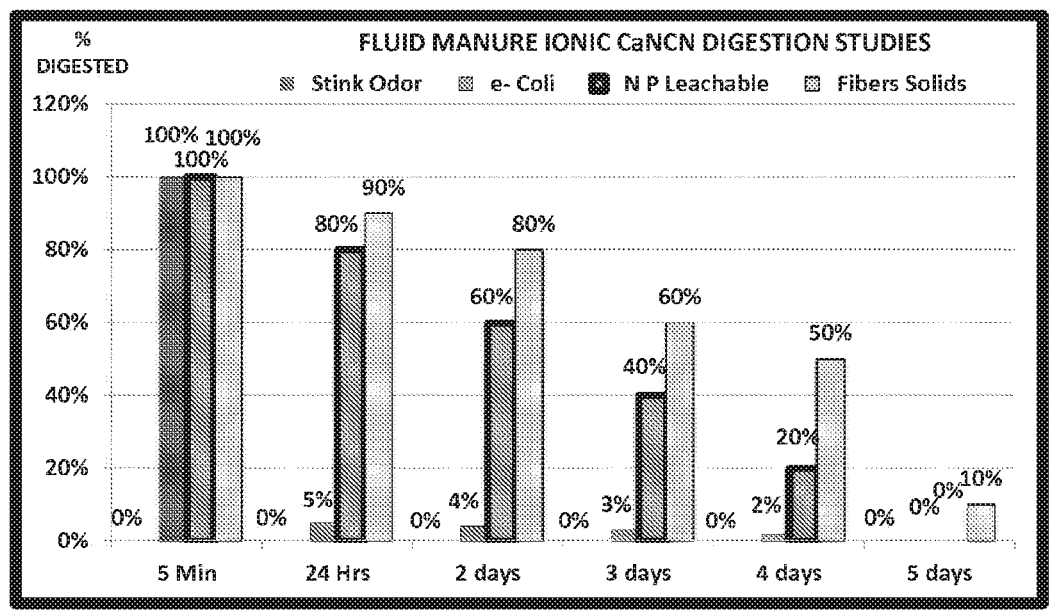
FIG. 7 is a bar graph showing the time degradation effect from disclosed fluid digested calcium containing CaNCN in fluid manures. The operative is for calcium to remove the undesirable factors of manures by the digestion of feces and thus, the source of stink odor and harborant food for human harmful organisms.

Table 7 and FIG. 7 display the time degradation effect of CaNCN in fluid dairy manure. This data was generated from extensive laboratory studies that graded disappearance and appearance of negative and positive sensations and visuals from CaNCN treated fluid dairy excreta.

The operative is the digestion of feces and thus the source of stink odor and harborant food for human harmful organisms. Not shown is that CaNCN increases beneficial organisms, included in the term coliform, of which is included human harmful coliform. Laboratory analysis showed an increase in beneficial "coliform" while human harmful *e-coli* coliform was un-detectable. Exposure of CaNCN was over a 5 day period.

TABLE 7

| 0.2% CaNCN In Fluid Manures Time | Stink Odor | e-Coli | NP Leachable | Fibers Solids |
|---|---|---|---|---|
| 5 Min | 0% | 100% | 100% | 100% |
| 24 Hrs | 0% | 5% | 80% | 90% |

TABLE 7-continued

| 0.2% CaNCN In Fluid Manures Time | Stink Odor | e-Coli | NP Leachable | Fibers Solids |
|---|---|---|---|---|
| 2 days | 0% | 4% | 60% | 80% |
| 3 days | 0% | 3% | 40% | 60% |
| 4 days | 0% | 2% | 20% | 50% |
| 5 days | 0% | 0% | 0% | 10% |

Figure 8:
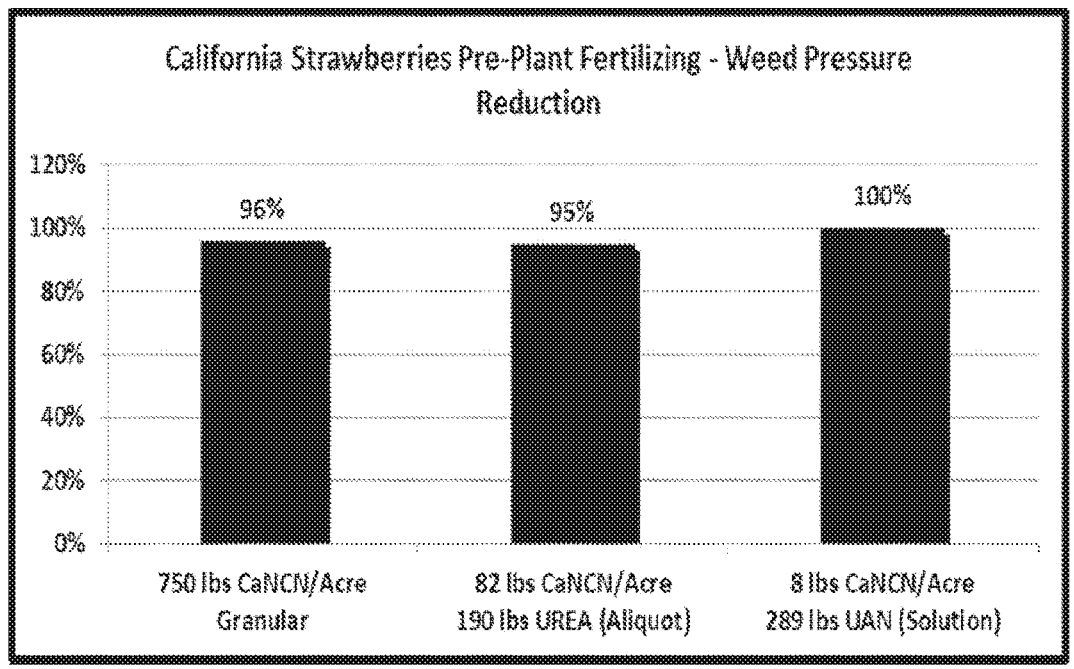
FIG. 8 is a bar graph showing synergistic fertilizer ancillary reduced plant competing weed pressure between preplant strawberry fertilizing with 1.) 750 lbs hardened granules CaNCN/acre on 5 weed species, 2.) decanted aliquot from making 82 lbs CaNCN/acre together with 190 lbs of urea/acre in water on 7 weed species, 3.) disclosed fertilized compositions from making 8 lbs/acre CaNCN together with 289 lbs UAN in solution/acre on 7 weed species. The 8 lbs was a dramatic, unexpected 9× and 94× reduction of CaNCN use and 8 lbs/289 lbs was 100% alkaline weed seed tissue digestion versus less than 100% from 94× more CaNCN. This was a visually clear demonstration of CaNCN's synergistic contribution to making soluble and some weakly soluble common fertilizer compounds into the $3^{rd}$ from left bar's disclosed soluble, plant absorbable, ionic nutrients solution.

Table 8 and FIG. 8 show synergistic fertilizer ancillary reduced plant competing weed pressure between pre-plant strawberry fertilizing with 1.) 750 lbs hardened granules CaNCN/acre on 5 weed species, 2.) decanted aliquot from making 82 lbs CaNCN/acre together with 190 lbs of urea/acre in water on 7 weed species, 3.) disclosed fertilized compositions from making 8 lbs/acre CaNCN together with 289 lbs UAN in solution/acre on 7 weed species. The 8 lbs was a dramatic, unexpected 9× and 94× reduction of CaNCN use and 8 lbs/289 lbs was 100% alkaline weed seed tissue digestion versus less than 100% from 94× more CaNCN. This was a visually clear demonstration of CaNCN's synergistic contribution to making soluble and some weakly soluble common fertilizer compounds into disclosed soluble, plant absorbable, ionic nutrients solution (FIG. 8 far right $3^{rd}$ bar displays this effect).

TABLE 8

| FERTILIZER RATES | | WEEDS NOT EMERGED |
|---|---|---|
| 750 lbs CaNCN/Acre | Granular | 96% |
| 82 lbs CaNCN/Acre | 190 lbs UREA (Aliquot) | 95% |
| 8 lbs CaNCN/Acre | 289 lbs UAN (Solution) | 100% |

At about 1 part of CaNCN fertilizer to about 40 to about 100 parts of common fluid nitrogen fertilizers, this record of visuals shown in FIG. 8 displays the disclosed operative of improved nutrient efficiency expressed by fertilizer ancillary effects. As seen in FIG. 8, the effects are from the common fluid fertilizers, ionized to electrolyte solutions by CaNCN, not from CaNCN itself. This visually displays the synergistic ratio between CaNCN and common fertilizers, disclosed in the tables and figures.

One of the most practical and surprising operative of this disclosure is that the effects were achieved at practical rates of nitrogen per acre. The CaNCN/UAN rates were 106 and 94 lbs of nitrogen/acre whereas the CaNCN rate/acre was at 180 lbs of nitrogen/acre, which is considered excessive for environmental protection purpose. A CaNCN/UAN rate of 50 lbs/acre attained a 90% emergence reduction of nut grass, which even ozone suspect gaseous methyl bromide gas cannot attain at 350 lbs. per acre.

The cost of the base fertilizers added to CaNCN is zero, because they are assessed against typical nitrogen nutrient feeding by common fertilizer at standard rates/acre.

The disclosed method of soil pre-plant placement was concentrated at about 4 inches deep, where new, newly planted, strawberry plant roots are to reside two weeks later. Over the following 9 months of the strawberry season, standard UAN solution is typically post-plant drip nitrigated at non-plant-harmful rates/acre. llb/acre CaNCN in UAN stabilizes that UAN. Such CaNCN/UAN drips induced ancillary effects of uniform blossoming and fruit pickings, expected from carbon/nitrogen and ammonium N forms and electrolyte solutions created by the disclosed solutions. Such effects at 1 lb CaNCN/acre in UAN, pre-plant sprayed onto cultivated soil are confirmed by disclosed FIGS. 6, 10, and 11 corn studies.

Additionally, the disclosed effect on weed emergence calls attention to the published effect of Alkaline Tissue Digestion (Alkaline Hydrolysis); U.S. patented Christmas day 1888, Amos Herbert Hobson, Middlesex, England, 394,982, where the disclosed tissue is weed seeds. Weed seed emergence made underground effects are visible. Invisible microscopic plant root antagonists are likely similarly effected. The latter's reproduction is pH sensitive. The disclosed, no-heat, cultural practice effects were recorded by Hartmann as a temporary high soil pH shift.

The disclosed 38× and 125×>"8 lbs/acre CaNCN" (about 2.5%) clearly demonstrates that the disclosed dynamic alkaline tissue digesting effect is from 0.25%-2.5% CaNCN stabilized UAN fertilizing, not from CaNCN fertilizing. The likely operative for the disclosed visual effect of alkaline weed seed tissue digestion is the last in a sequence of UAN phases from CaNCN particle digesting to the disclosed fluid equilibrium compositions.

CaNCN in water reaches 12.2 pH. UAN nitric acid alkaline metals digestion first attains 9.5 pH. Continuing Ca++ alkaline acid metals digestion attains final pH 8.5. Ca++ urea polymer digestion to $NH_3$ gas can attain pH 14. Its dilution in water to 24% $NH_4$ ($NH_4OH$) equilibrium is typically 12 to 13 pH.

Stabilized $NH_4$ nitrogen is naturally preferred by plants. Non-CaNCN-stabilized $NH_4$ transforms to leachable $NO_3$ N which plants cannot use, that robs plants of energy because they lose energy by converting it back to plant useable $NH_4$. This statement is consistent with disclosed 10× less 0.25% CaNCN stabilized UAN increasing ear leaf nitrogen, 29% more yield and 33% more sugar energy, disclosed in Tables and FIGS. 6 and 11.

Figure 9:
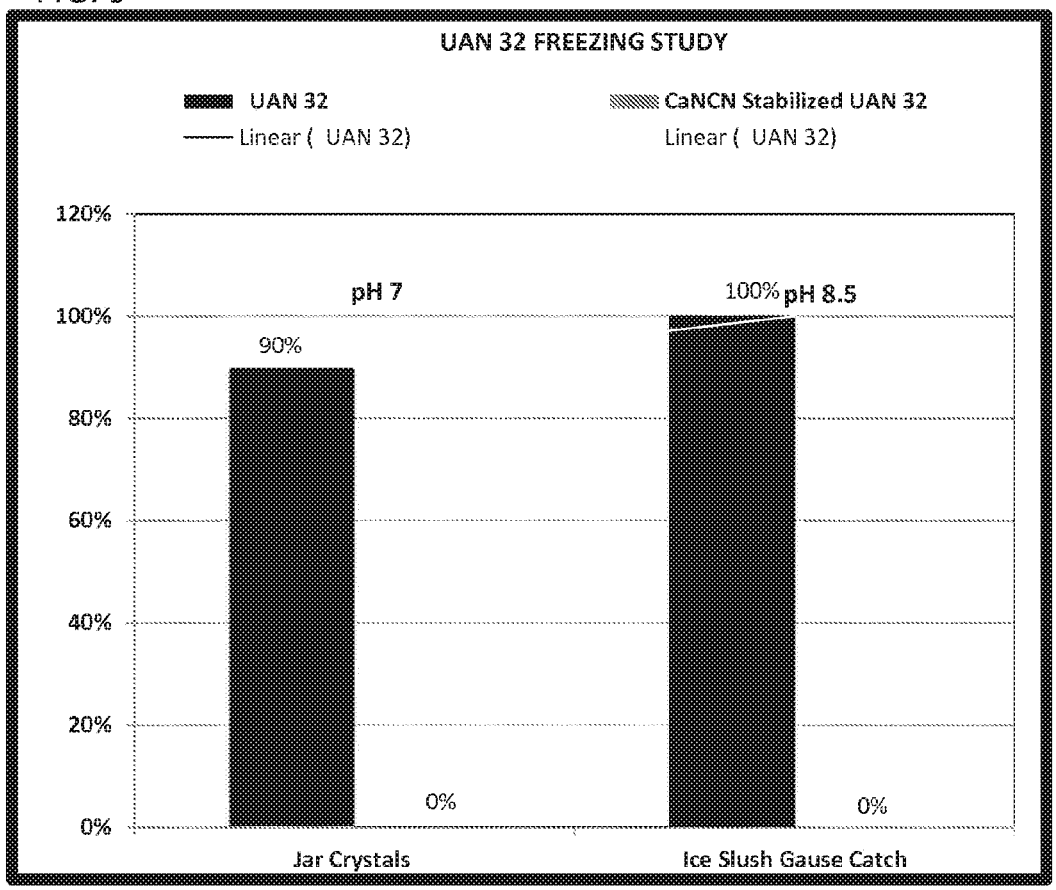
FIG. 9 is a bar graph showing the visual response to freezing overnight temperature of jarred dilute 0.25% CaNCN in UAN 32. Clearly it displayed that CaNCN in UAN, reduces the freezing point of commercial UAN 32 down to zero degrees Fahrenheit.

Table 9 and FIG. 9 display the visual responses to freezing overnight temperature of jarred dilute 0.5% CaNCN in UAN 32. Table 9 data was developed from observations of static jars of the disclosed solutions in winter overnight and freezer conditions and confirmed by mid-winter Missouri overnight observations. Clearly it displayed that CaNCN in UAN, even at lowest dose, prevents freezing of commercial UAN 32 down to zero ° F. One such observation was at 5 degrees below zero.

TABLE 9

| 0 Deg. F. FREEZING PERCENTS | UAN 32 | CaNCN Stabilized UAN 32 |
| --- | --- | --- |
| Jar Crystals | 90% | 0% |
| Ice Slush Gauze Catch | 100% | 0% |

Figure 10:
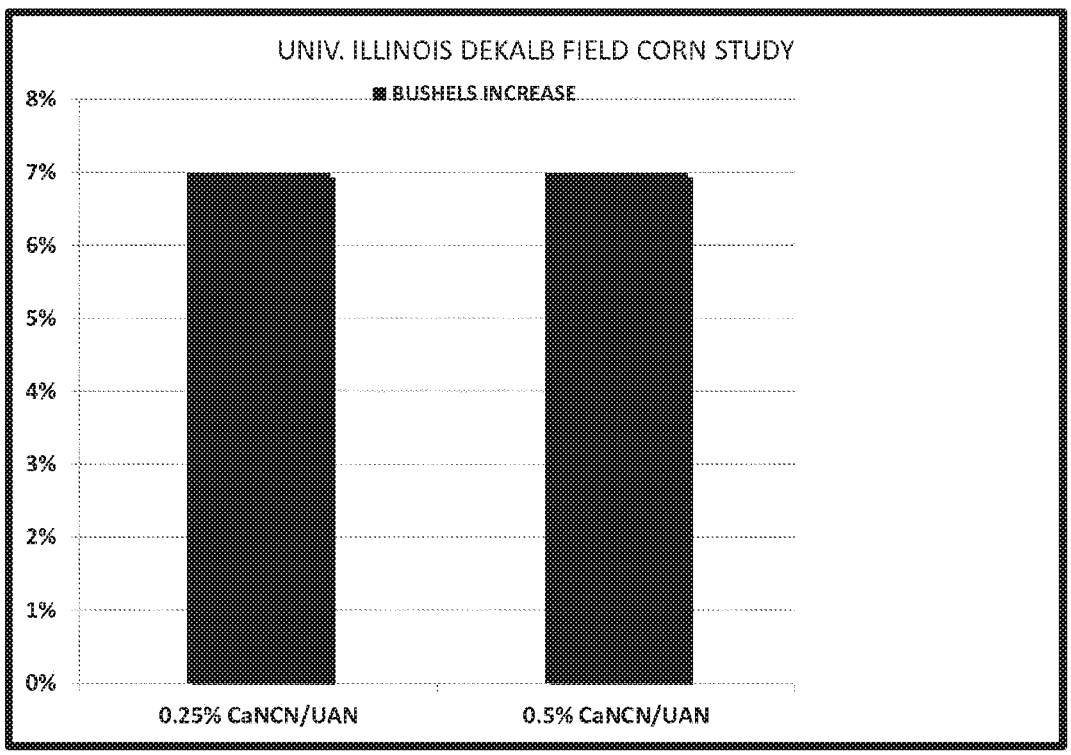
FIG. 10 is a bar graph showing a field corn study yield increases from CaNCN in fluid UAN compositions at two levels of 0.25% and 0.5%. This demonstrates that 0.25% CaNCN in the present application activated carbon is enough for microbes to feed on to hold their nitrogen from 99.75% UAN.

Table 10 and FIG. 10 display field corn yield increases from CaNCN inside UAN at two levels of 0.25% and 0.5%. This information suggests that 0.25% is enough to create stabilized nitrogen in 99.75% UAN.

The principal of this stabilizing technology is for CaNCN to induce early release of its diluents' N nutrients for early baby plant roots feeding so the nutrients are plant captured for succeeding plant maturity phases through harvest, instead of being lost to early in-soil leaching.

Stabilized indicates succeeding in-season reproductive, resistant growth. This phenomenon is of record for CaNCN. CaNCN at 1 lb/acre inside 100 lbs of UAN nitrogen (N)/acre suggests synergistic action between UAN and hydrolyzed CaNCN. This means that all of UAN can express unique reproductive and ancillary fertilizer responses.

TABLE 10

| CaNCN PERCENTS | BUSHELS INCREASE |
| --- | --- |
| 0.25% CaNCN/UAN | 7% |
| 0.5% CaNCN/UAN | 7% |

Figure 11:
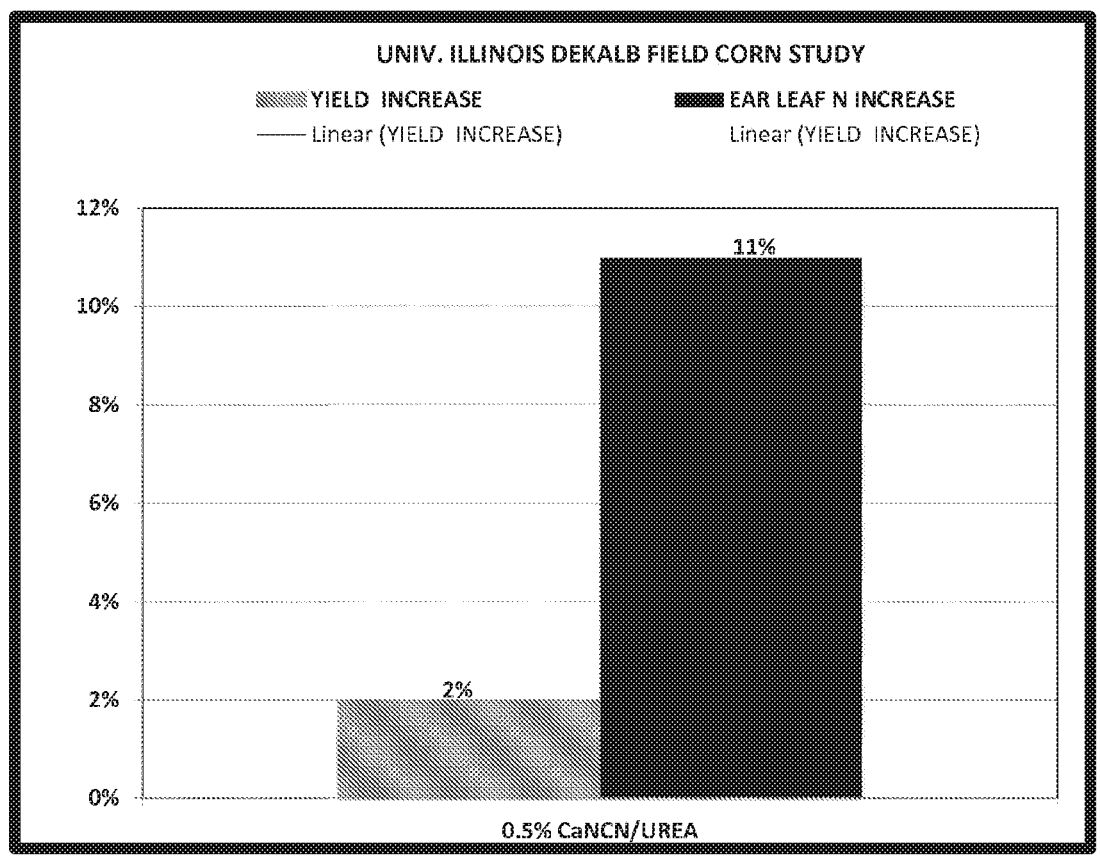
FIG. 11 is a bar graph showing the improved nitrogen content in the ear leaves of field corn in a study, from 0.5% CaNCN in fluid UAN compositions. This evaluation is standard in determining the fate, ratio and destinations of soil applied nitrogen.

Table 11 and FIG. 11 display the improved nitrogen content in the ear leaves of field corn from 0.5% CaNCN inside fluid UAN. This evaluation is standard in determining the ratio and destinations of soil applied nitrogen.

Corn kernel yields from corn ears are the objective of applied nitrogen. The ear leaf sap is likely to indicate what degree of applied nitrogen has reached the corn ears. CaNCN inside UAN was recorded as not only influencing reproductive corn growth, but also increasing chlorophyll related to recovered increased sugar brix in growing corn stock and leaves' sap, likely to be expressed in corn kernels, "intuitively preferred by animals."

This has also been recorded as making 2.8× more food from corn and 150 more gallons of biofuel/acre, all on today's corn acres. At $2.50/gallon of gas this can generate 1/2 $Trillion to U.S. treasuries and jobs economy.

TABLE 11

| YIELD/LEAF N PERCENTS | YIELD INCREASE | EAR LEAF N INCREASE |
| --- | --- | --- |
| 0.5% CaNCN/UREA | 2% | 11% |

Figure 12:
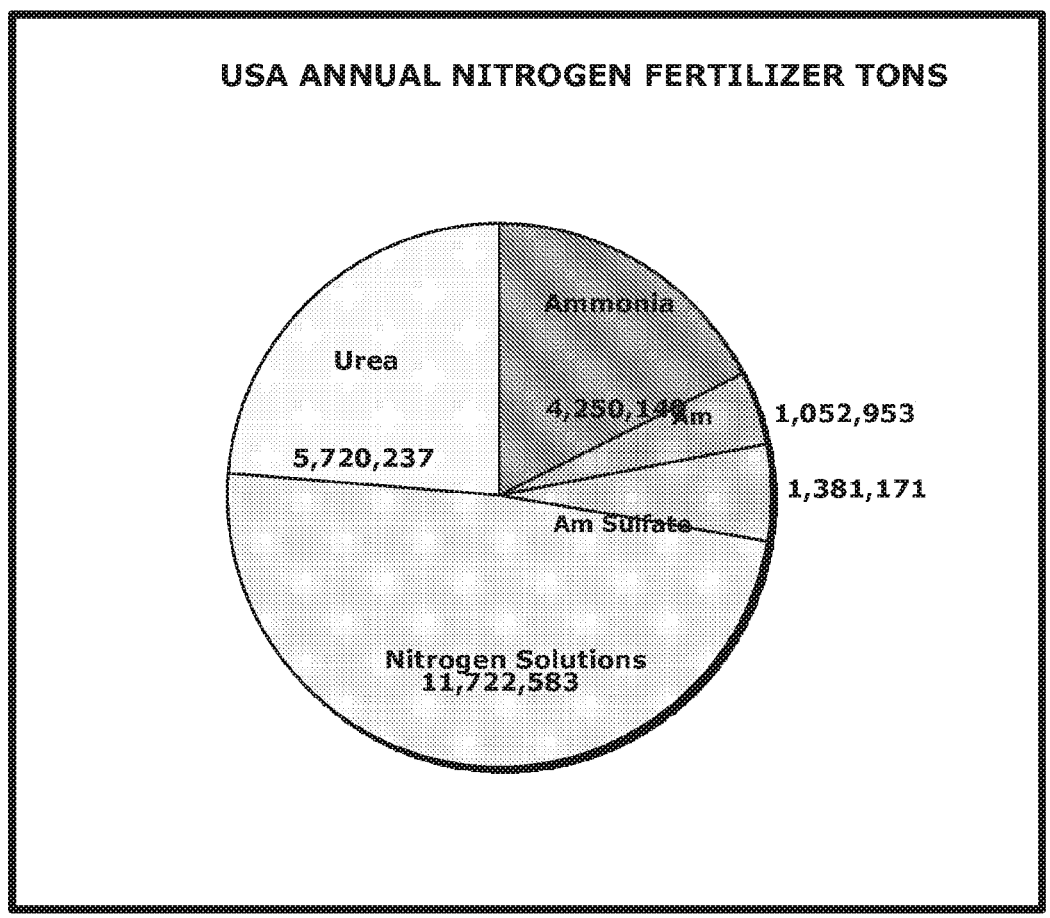
FIG. 12 is a pie chart showing the U.S nitrogen fertilizer market shares per annum for both dry and fluid nitrogen fertilizers.

FIG. 12 illustrates the U.S nitrogen fertilizer market shares per annum for both dry and fluid nitrogen fertilizers. Putting CaNCN usage to practice as in these disclosures to 50% U.S. market share nitrogen solutions is most likely to reach most of the nation's watersheds for cleaner waters and air and farm fertilizing practice benefits in multiples over any other means.

Figure 13:
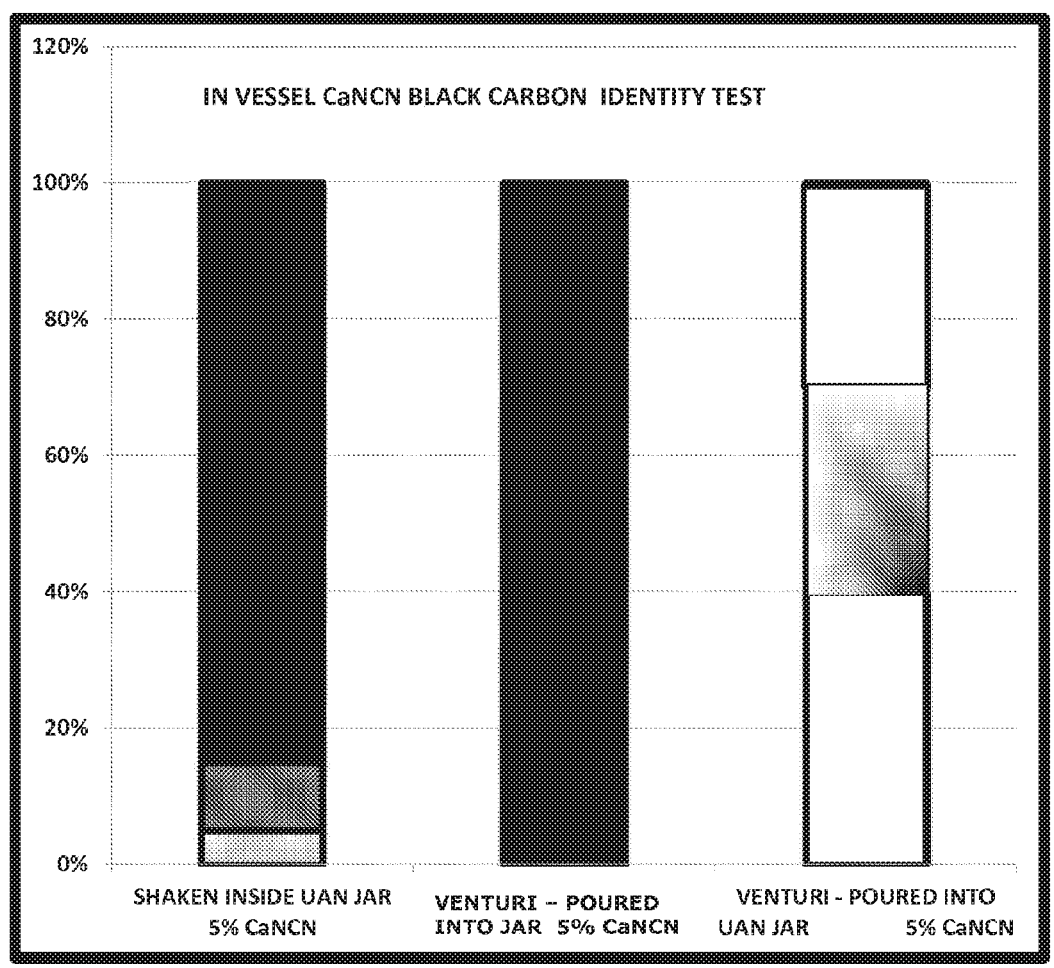
FIG. 13 is a bar graph illustrating the compositions' carbon that feeds soil microbes that feed plant root growth. Thus, such microbe feeding carbon can be a constant companion with the disclosed ionic plant nutrients, for a synergistic higher level of feeding plant roots.

FIG. 13 illustrates that carbon that feeds soil microbes that feed plant root growth, can be a constant companion with the ionic plant nutrients disclosed herein. Each of the columns depicts jars of insoluble Calcium Cyanamide (CaNCN) in UAN for 25 days. The left hand column, with two levels of gray settlement, resulted from hand shaking 5% dry CaNCN in a jar of UAN; the middle column, with no settlement, resulted from dumping pre-venturi blended 5% CaNCN in UAN into an empty jar; and the right hand column depicted where carbon from CaNCN statically floats in a jar of UAN from slowly pouring Pre-venturi blended 5% CaNCN at a 1 to 10 ratio into a jar of UAN. This opportunity to visually see the status of carbon in saturated UAN indicates fluid ionized compositions disclosed herein likely include such digestion action on the carbon from CaNCN. The PAC definition (carbon granules less than 0.15 mm with holes and dramatically enlarged surface areas) describes this lighter particles suspended in dense fluids effect on CaNCN graphite carbon. The next smallest carbon form from graphite may be graphine.

Figure 14:
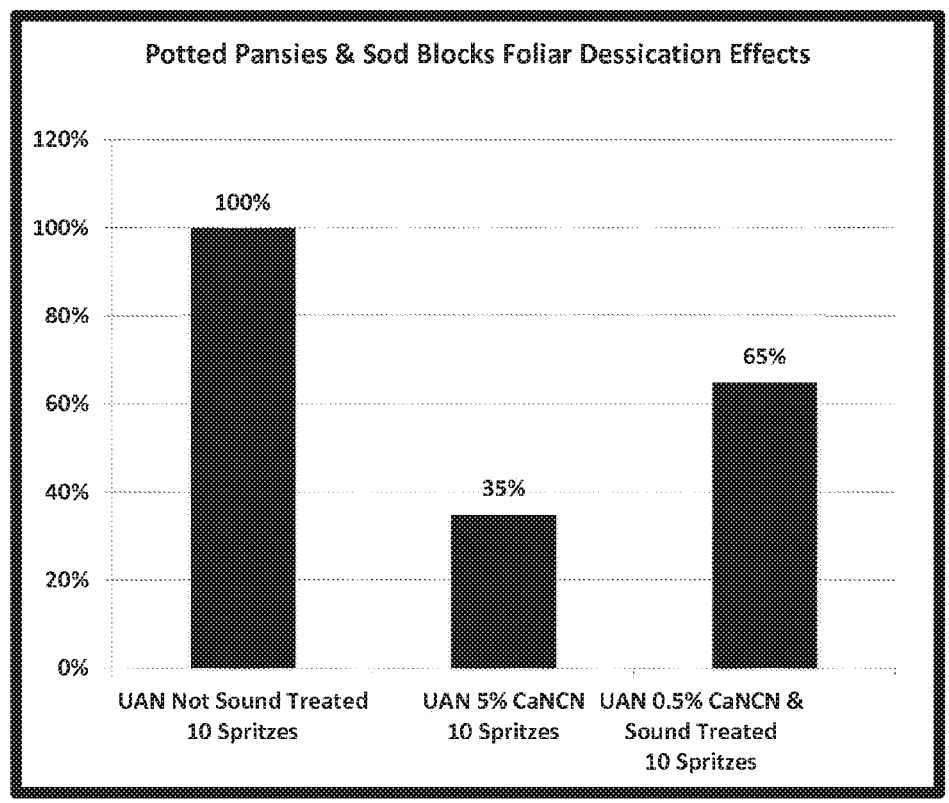
FIG. 14 displays a UAN foliar phytotoxicity effects summary from of three separate non-replicated pansy holed pots with adjacent sod pads in a water holding tray. The UAN desiccated the pansy and adjacent sod pad 100%. The carbon containing 5% CaNCN composition lowered pansy and sod desiccation 65%. The near nil 10× diluted 0.5% CaNCN composition, that was MDB treated, lowered the pansy and sod desiccation 35%. Therefore, both the carbon and the MDB treatment contributed to lowering UAN desiccation.

FIG. 14 displays UAN foliar pyhytotoxicity effects summary results from of two separate non replicated pansy pots and adjacent sod pads in a water holding tray. The UAN desiccated the pansy and sod pad 100%. The carbon containing 5% calcium cyanamide (CaNCN) composition lowered pansy and sod desiccation 65%. The near nil 10× diluted 0.5% CaNCN composition, that was QHD resonance treated, lowered the pansy and sod desiccation 35%. Therefore, both the carbon and the QHD resonance contributed to lowering UAN desiccation.

TABLE 12

| 2012 CARBON UAN OVER UAN SPRING FERTILIZED FOR BOTH SUMMER CORN & FALL RYEGRASS/ RADISH COVER CROP | | CARBON INFLUENCES |
|---|---|---|
| Summer Corn 5 Bushels | Per Acre | 3% |
| Winter Cover Crop Ryegrass | Root Mass | 50% |
| Winter Cover Crop Radish | Root Mass | 88% |
| Winter Cover Crop Ryegrass | Top Height | 117% |
| Winter Cover Crop Radish | Top Height | 75% |
| Winter Cover Crop Ryegrass | Leaf Width | 100% |
| Winter Cover Crop Radish | Leaf Width | 67% |

Figure 15:
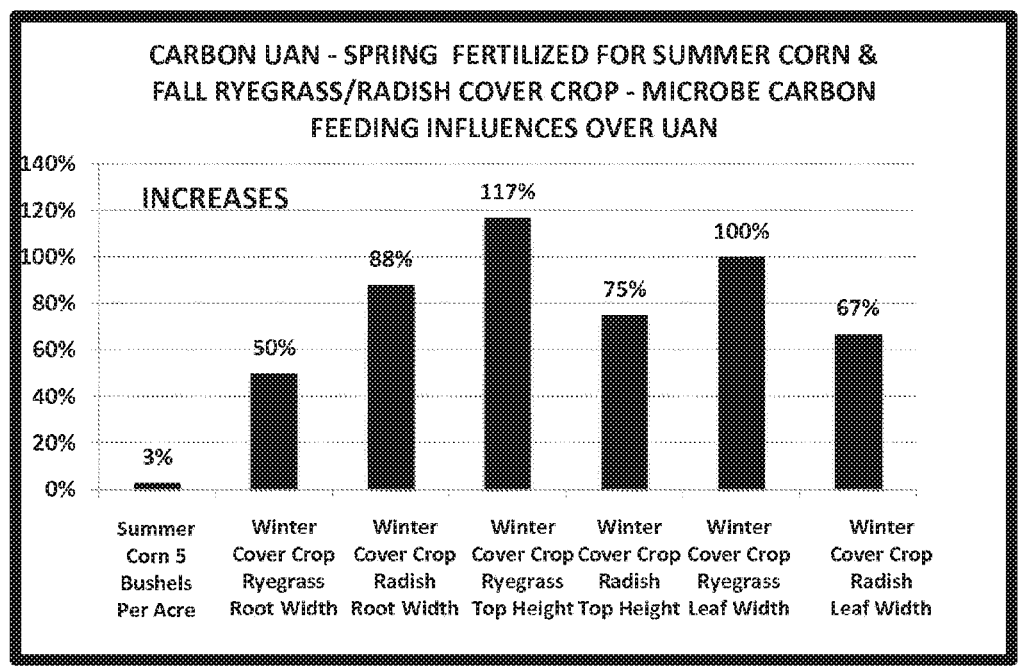
FIG. 15 lists two sequential corn and cover crop cropping, their grading categories in yield and plant responses, in percentage increases from carbon UAN over UAN only.

FIG. 15 and Table 12 illustrate the influences of carbon feeding soil microbes when carbon is in UAN over UAN only. In four field corn replications at Southern Illinois Arise Research and Discovery Station these influences were expressed in magnitudes. Consistent with previous years studies, the carbon UAN influenced a significant 5 bushels per acre corn yield increase from one spring fertilizer treatment for the summer corn, which is typically expected to use up its fertilizer treatment. Unexpected, that one treatment further extended itself into the following second crop of Annual Ryegrass/Tillage Radish winter cover crop. In fact, these latter mixed plant types, pulled at their same early stages crop expressed plant responses in much greater magnitudes than the corn even in early stage. Tillage is reported to damage soil microbes. Both these crops were pre-tilled. This indicates that carbon from ionized fluid UAN feeds soil microbes to the extent that they thrive under tillage actions to a point of building an increasingly sustainable healthy soil, like from organic farming. Such microbe rich soil holds plant nutrients in the microbes for microbe multiplying growth. Thus, the nutrients are not lost to the environment.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A method of composting or decomposition of soil organic matter, comprising:
    applying an effective amount of a sprayable fluid composition to soil organic matter for composting or decomposition of soil organic matter, wherein the fluid composition comprises:
        a mixture of about 40 to 20 parts of dissolved acid or acid-formed approximately neutral pH nitrogen plant nutrient compounds and about 1 to about 5 parts of a mixture of insoluble or weakly soluble calcium-formed plant nutrient compounds,
    wherein the dissolved acid comprises nitric acid, phosphoric acid, a weak carbonic acid or a combination thereof and the acid-formed nitrogen plant nutrient compounds are in solution and comprise fluid urea ammonium nitrate (UAN), ammonium nitrate, or calcium ammonium nitrate, or combinations thereof; and
    the insoluble or weakly soluble calcium-formed plant nutrient compounds are in solution and comprise $H_2O$ and lime nitrogen.

2. The method of claim 1, wherein the $H_2O$ present in the fluid composition comprises at least 14× the mass of the insoluble or weakly soluble calcium formed plant nutrient compounds.

3. The method of claim 2, wherein applying an effective amount comprises applying the sprayable fluid composition by spraying, soil shank injecting or sprinkler or drip irrigation.

4. The method of claim 2, wherein the insoluble or weakly soluble calcium formed plant nutrient comprises lime nitrogen.

5. The method of claim 2, wherein the fluid composition comprises particles of about 60 to about 100 mesh pass through screen size.

6. The method of claim 1, wherein the UAN solution comprises about 30% to about 35% urea, about 40% to about 45% ammonium nitrate with the residual as $H_2O$.

7. The method of claim 1, wherein the $H_2O$ present in the fluid mixture comprises less than 14× the mass of the insoluble or weakly soluble calcium formed plant nutrient compounds in the mixture.

8. The method of claim 1, further comprising adding at least one non-nitrogen material to the composition.

9. The method of claim 8, wherein the non-nitrogen material is a plant nutrient.

10. The method of claim 9, wherein the plant nutrient is selected from the group consisting of phosphorous, potassium, iron, copper, zinc, manganese, boron, magnesium, molybdenum, sulfur, magnesium, nickel, and mixtures thereof.

11. The method of claim 1, further comprising adding excreta to the composition.

12. The method of claim 11, wherein the excreta comprises liquidized manure or dairy excreta.

13. The method of claim 1, further comprising combining a mixture of about 40 to 20 parts of dissolved acid or acid-formed approximately neutral pH nitrogen plant nutrient compounds to about 1 to about 5 parts of a mixture of insoluble or weakly soluble calcium-formed plant nutrient compounds, where the dissolved acid includes nitric acid, phosphoric acid, a weak carbonic acid or a combination thereof and the acid-formed nitrogen plant nutrient compound are in solution and comprise ammonium nitrate, calcium nitrate, urea ammonium nitrate, calcium ammonium nitrate, or combinations thereof and the insoluble or weakly soluble calcium-formed plant nutrient compounds are in solution and comprise calcium cyanamide, gypsum, calcium carbonate, calcium chloride or combinations thereof, thereby forming a fluid composition prior to applying the effective amount.

14. The method of claim 1, wherein the approximately neutral pH nitrogen plant nutrient compound mixture comprises a pH of about 7.8 and 7.9.

* * * * *